(12) United States Patent
Kobayashi et al.

(10) Patent No.: US 7,619,348 B2
(45) Date of Patent: Nov. 17, 2009

(54) MOTOR, LENS BARREL, CAMERA SYSTEM, AND METHOD FOR PRODUCING MOTOR

(75) Inventors: Mina Kobayashi, Kawasaki (JP); Mamoru Inoue, Saitama (JP)

(73) Assignee: Nikon Corporation, Tokyo (JP)

( * ) Notice: Subject to any disclaimer, the term of this patent is extended or adjusted under 35 U.S.C. 154(b) by 177 days.

(21) Appl. No.: 11/703,158

(22) Filed: Feb. 7, 2007

(65) Prior Publication Data

US 2007/0188051 A1 Aug. 16, 2007

(30) Foreign Application Priority Data

Feb. 13, 2006 (JP) ............... 2006-035139
Jun. 27, 2006 (JP) ............... 2006-177038
Feb. 1, 2007 (JP) ............... 2007-023428

(51) Int. Cl.
*H01L 41/08* (2006.01)
(52) U.S. Cl. ............... 310/323.11; 310/323.04
(58) Field of Classification Search ............ 310/323.04, 310/323.03, 323.08, 323.11
See application file for complete search history.

(56) References Cited

U.S. PATENT DOCUMENTS

| | | | | |
|---|---|---|---|---|
| 4,736,129 A | * | 4/1988 | Endo et al. ............ | 310/323.11 |
| 4,926,085 A | | 5/1990 | Sawayama et al. | |
| 4,978,882 A | * | 12/1990 | Kitani ............ | 310/328 |
| 5,028,833 A | | 7/1991 | Kawai | |
| 5,034,646 A | * | 7/1991 | Shirasaki ............ | 310/323.11 |
| 5,148,075 A | * | 9/1992 | Shirasaki ............ | 310/323.11 |
| 5,329,201 A | | 7/1994 | Shirasaki | |
| 5,508,581 A | | 4/1996 | Saya et al. | |
| 5,557,157 A | | 9/1996 | Shirasaki | |
| 5,912,525 A | | 6/1999 | Kobayashi et al. | |
| 6,463,642 B1 | | 10/2002 | Maruyama et al. | |

FOREIGN PATENT DOCUMENTS

| | | |
|---|---|---|
| EP | 0 313 352 A2 | 4/1989 |
| EP | 0 328 058 A2 | 8/1989 |
| EP | 0 739 750 A1 | 10/1996 |
| EP | 1 666 516 A1 | 6/2006 |
| JP | A-07-194152 | 7/1995 |
| JP | B2 2578903 | 11/1996 |

* cited by examiner

*Primary Examiner*—Mark Budd
(74) *Attorney, Agent, or Firm*—Oliff & Berridge, PLC

(57) ABSTRACT

An oscillatory wave motor, a lens barrel, and a camera system are provided, which have long service lives and which are stable. An oscillatory wave motor includes an oscillator which generates oscillation on an elastic member in accordance with excitation of an electromechanical conversion element, and a relative movement member which is pressurized to make contact with the oscillator and which moves relative to the oscillator in accordance with the oscillation. The oscillatory wave motor has an epoxy resin film formed of silicon beads and an epoxy resin and which is formed on at least one of frictional contact surfaces of the oscillator and the relative movement member.

33 Claims, 6 Drawing Sheets

MOTOR, LENS BARREL, CAMERA SYSTEM, AND METHOD FOR PRODUCING MOTOR

BACKGROUND OF THE INVENTION

1. Field of the Invention

The present invention relates to a motor, a lens barrel, a camera system, and a method for producing the motor.

2. Description of the Related Art

Conventionally, in the case of an oscillatory wave motor which is one type of the motor, an oscillator is subjected to the frictional contact with a relative movement member which serves as a relative movable member. The oscillatory wave, for example, the ultrasonic oscillation or vibration, which is generated on the oscillator, is transmitted to the relative movement member, and the relative movement member is frictionally driven. Therefore, it is necessary that the oscillator efficiently transmits the applied ultrasonic oscillation to the relative movement member. Therefore, a highly elastic material, for example, an iron-based or stainless steel-based metal material is used for the oscillator.

A variety of attempts have been made for the frictional contact surfaces of the oscillator and the relative movement member. U.S. Pat. No. 4,926,085 A1 (corresponding to Japanese Patent No. 2578903) discloses an example in which an alumite layer is provided on one of the frictional contact surfaces, and a nickel layer (Ni layer) is provided on the other of the frictional contact surfaces. The alumite layer herein refers to an oxide coating layer having corrosion resistance formed by performing the anodic oxidation for aluminum.

Any lubricating oil cannot be used for the frictional contact surfaces of the alumite layer and the Ni layer. Therefore, the frictional contact surface principally undergoes the lubrication which is not based on the fluid dynamics, i.e., the so-called boundary lubrication. Therefore, the alumite layer plays a role like the lubricating oil, which greatly affects the transmission efficiency of the ultrasonic oscillation and the function of the oscillatory wave motor.

However, the conventional oscillatory wave motor has involved the following problems. That is, when the frictional contact surface between the oscillator and the movable member is subjected to the frictional driving for a long period of time, the stability of the frictional contact surface cannot be maintained due to the appearance of the abrasion powder generated by any considerable damage of the frictional contact surface resulting from the small difference in hardness between the alumite layer and the Ni layer and/or the deterioration of the alumite layer. Therefore, problems arise such that any abnormal sound or noise is generated and/or the driving efficiency is lowered.

Further, the following problems arise. That is, the frictional contact surface becomes unstable due to the abrasion, and that when the driving operation is performed for a long period of time under the high load, then the number of revolutions is suddenly lowered, it is thus impossible to maintain the stable driving, and the driving performance is deteriorated.

Further, in the case of the conventional oscillatory wave motor using the frictional contact surfaces which are mutually composed of the inorganic materials such as the alumite layer and the Ni layer, for example, a surface treatment is coated on both of the oscillator and the relative movement member. Therefore, problems arise such that the number of working steps is large, and the production cost is expensive. In particular, any masking treatment is required for the elastic member in order to prevent the adhering surface of the electromechanical conversion element from being treated with the surface treatment, because the electromechanical conversion element is to be adhered thereto. Further, problems arise such that large amounts of the time and cost are required for the discarding treatment for discarding the surface treatment liquid.

In addition to the oscillatory wave motor as described above, another oscillatory wave motor is also known, wherein a formed and processed product, which is obtained by forming and processing a resin such as plastic, is used for one of the frictional contact surfaces. However, the forming condition, which is adopted to form the resin, greatly affects the physical property of the formed and processed product. Therefore, the following problem arises. That is, it is difficult to select the optimum forming condition under which the formed and processed product of the resin is provided with the optimum physical property to be used for the frictional contact surface.

In order to use the formed and processed product for the frictional contact surface, it is necessary that the cutting machining is coated on improve the dimensional accuracy. Usually, for example, a conductive carbon filler is added as a frictional coefficient-increasing agent to the formed and processed product of the resin. However, any considerable damage is caused on the blade of the cutting tool due to the conductive carbon filler or the like. Therefore, it has been impossible to increase the cutting velocity. Further, it is also necessary that the cut and processed product is joined to the elastic member, for example, with an adhesive. In consideration of such circumstances, the following problem arises. That is, when the formed and processed product of the resin, which is added with, for example, the conductive carbon filler as the frictional coefficient-increasing agent, is used for the elastic member, then a long period of time is required for the processing, the production cost becomes expensive, and it is difficult to obtain any desired dimensional accuracy.

SUMMARY OF THE INVENTION

An object of the present invention is to provide a motor which is stable and which has a long service life, a method for producing the same, a lens barrel, and a camera system.

According to a first aspect of the present invention, in order to achieve the object as described above, there is provided a motor comprising: a first member; a second member which makes contact with the first member, the first member and the second member being relatively movable; and a thermosetting resin film which is formed of a particulate additive and a thermosetting resin, and which is formed on at least one of contact surfaces of the first member and the second member.

In the motor of the present invention, the additive may be exposed on a surface of the thermosetting resin film.

In the motor of the present invention, the additive may contain at least one of silicon beads, acrylic beads, and carbon beads.

In the motor of the present invention, the silicon beads may be contained in an amount of 5 to 20% by weight.

In the motor of the present invention, the silicon beads may have a particle size of not more than 6 μm.

In the motor of the present invention, the acrylic beads may be contained in an amount of 5 to 30% by weight.

In the motor of the present invention, the acrylic beads may have a particle size of not more than 5 μm.

In the motor of the present invention, the thermosetting resin film may be formed by using polytetrafluoroethylene.

In the motor of the present invention, the thermosetting resin film may be formed by using a frictional coefficient-increasing agent which increases a frictional coefficient of the contact surfaces.

In the motor of the present invention, the thermosetting resin may contain at least one of an epoxy resin and a phenol resin.

In the motor of the present invention, the epoxy resin may be an isocyanate curable type epoxy resin.

In the motor of the present invention, the epoxy resin may be an epoxy resin to which a compound having one of phenolic hydroxyl group and methylol group is blended as a curable prepolymer.

In the motor of the present invention, the thermosetting resin film may be formed by using a fluororesin.

In the motor of the present invention, the fluororesin may be polytetrafluoroethylene.

In the motor of the present invention, the frictional coefficient-increasing agent may be carbon.

In the motor of the present invention, the carbon may be contained in an amount of 2 to 10% by weight.

In the motor of the present invention, the thermosetting resin film may have a thickness of not more than 60 μm.

In the motor of the present invention, the thermosetting resin film may contain polytetrafluoroethylene in an amount of 5 to 35% by weight.

In the motor of the present invention, the epoxy resin may be an epoxy resin to which a compound having one of phenolic hydroxyl group and methylol group is blended as a curable prepolymer.

In the motor of the present invention, the thermosetting resin film may have a thickness of not more than 100 μm.

In the motor of the present invention, the thermosetting resin film may contain polytetrafluoroethylene in an amount of 10 to 35% by weight.

In the motor of the present invention, the thermosetting resin film may have a surface roughness in which a maximum height roughness is not more than 1 μm.

In the motor of the present invention, the thermosetting resin film may have a vertical cross-sectional shape which is substantially trapezoidal.

In the motor of the present invention, the first member may be an oscillator which generates oscillation on an elastic member in accordance with excitation of an electromechanical conversion element; and the second member may be a relative movable member which moves relative to the oscillator by the oscillation.

According to a second aspect of the present invention, there is provided a lens barrel comprising: the motor of the first aspect of the present invention; and an optical system which is driven by using the motor as a driving source.

According to a third aspect of the present invention, there is provided a camera system comprising a mount portion to which the optical system of the second aspect of the present invention is mountable.

According to a fourth aspect of the present invention, there is provided a method for producing a motor, comprising: a step for providing a particulate additive and a thermosetting resin to at least one of contact surfaces of a first member and a second member; and a step for relatively moving the first member and the second member in a state in which the first member and the second member make contact with each other.

The method for producing the motor of the present invention may further comprise a step for curing the thermosetting resin and then performing polishing.

According to a fifth aspect of the present invention, there is provided a motor comprising: an oscillator which generates oscillation on an elastic member in accordance with excitation of an electromechanical conversion element; a relative movable member which moves relative to the oscillator by the oscillation while making contact with the oscillator; and a thermosetting resin film which is formed by using a particulate additive and a thermosetting resin containing at least one of an epoxy resin and a phenol resin and which is provided on at least one of contact surfaces of the oscillator and the relative movable member.

In the motor of the present invention, the additive may be acrylic beads; and the thermosetting resin may be an isocyanate curable type epoxy resin.

In the motor of the present invention, the additive may be silicon beads; and the thermosetting resin may be an epoxy resin including a phenol resin blended therein as a curable prepolymer.

The present invention is not limited to the aspects and features of the present invention as described above and will be explained in detail with reference to drawings. The construction may be appropriately changed. Further, at least a part or parts of the construction may be replaced with any other construction.

According to the present invention, it is possible to realize the motor which has a satisfactory start-up characteristic at a low speed and which is driven stably.

DESCRIPTION OF THE PREFERRED EMBODIMENTS

An epoxy resin film was formed on a frictional contact surface of an elastic member by using an epoxy resin.

Embodiments of the motor according to the present invention will be each explained below as exemplified by an oscillatory wave motor as an exemplary motor, specifically an ultrasonic motor which utilizes the oscillation or vibration region of the ultrasonic wave.

First Embodiment

Figure 4:
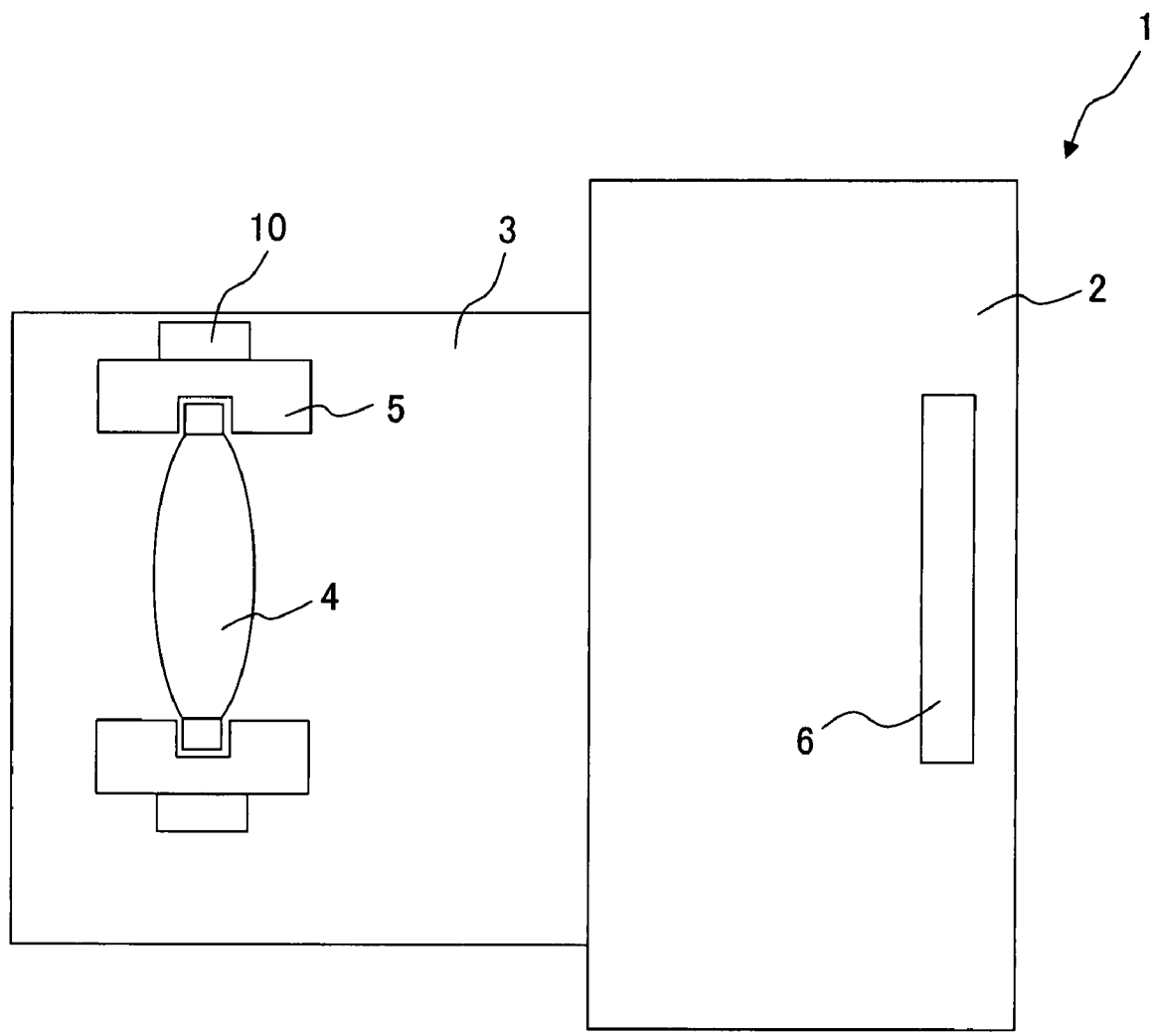
FIG. 4 shows a sectional view illustrating a camera provided with the oscillatory wave motor according to the first embodiment.

FIG. 4 shows a sectional view illustrating a camera provided an oscillatory wave motor according to a first embodiment.

A camera 1 of this embodiment includes a camera body 2 which has an image pickup device 6, and a lens barrel 3. The lens barrel 3 is an exchangeable lens which is detachable with respect to a mount portion of the camera body 2. The camera 1 of this embodiment is illustrative of a case in which the lens barrel 3 is the exchangeable lens. However, there is no limitation thereto. For example, it is also allowable to adopt a camera provided with a lens barrel which is constructed integrally with the camera body.

The lens barrel 3 includes, for example, a lens 4, a cam cylinder 5, and an oscillatory wave motor 10. In this embodiment, the oscillatory wave motor 10 is used as a driving source for driving the lens 4 when the camera 1 is subjected to the focusing operation. The driving force, which is obtained from the oscillatory wave motor 10, is transmitted to the cam cylinder 5. The lens 4 is cam-engaged with the cam cylinder 5. When the cam cylinder 5 is rotated by the driving force of the oscillatory wave motor 10, the lens 4 is moved in the direction of the optical axis in accordance with the cam engagement with the cam cylinder 5 to adjust the focal point.

Figure 1:
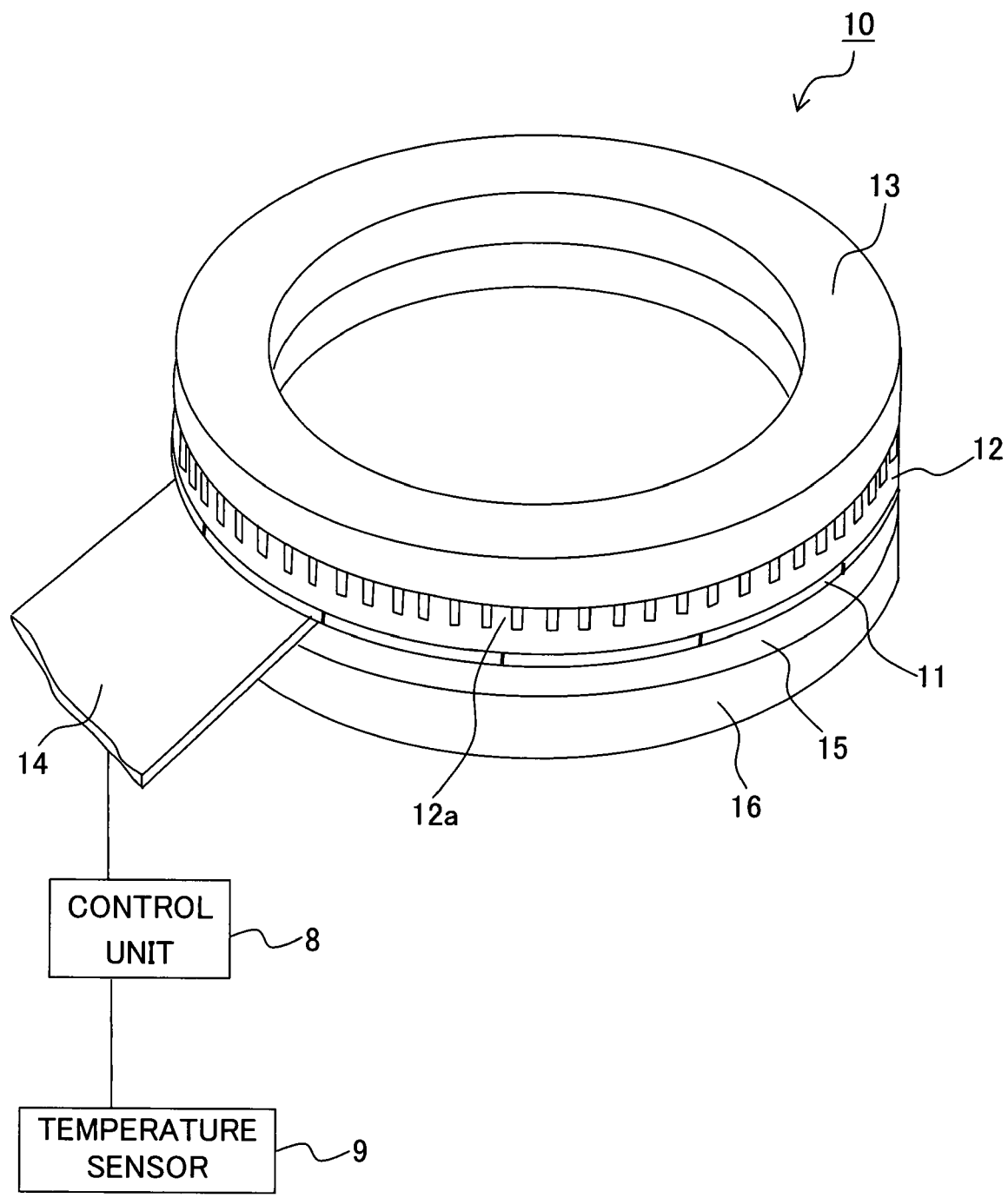
FIG. 1 shows a perspective view illustrating an oscillatory wave motor according to a first embodiment.

FIG. 1 shows a perspective view illustrating the oscillatory wave motor of the first embodiment.

The oscillatory wave motor 10 of the first embodiment includes, for example, a piezoelectric member 11 which constitutes an oscillator, an elastic member 12 which serves as the first member, a movable member 13 which serves as the second member, a flexible printed circuit board 14, an oscillation-absorbing member 15, and a support member 16. The oscillatory wave motor 10 is used for the lens barrel 3 of the camera 1 as described above. The oscillatory wave motor 10 is used as the driving source for driving the lens 4 during the focusing operation.

The piezoelectric member 11 is an electromechanical conversion element for converting the electric energy into the mechanical energy. The piezoelectric member 11 is fixed to the support member 16 of the lens barrel of the camera by the aid of the oscillation-absorbing member 15 such as a felt. The piezoelectric member 11 is expanded and contracted in accordance with the driving signal supplied from the flexible printed circuit board 14 to excite (drive, vibrate) the elastic member 12.

The elastic member 12 generates the progressive oscillatory wave in accordance with the excitation of the piezoelectric member 11. The elastic member 12 is formed of an iron alloy such as stainless steel, invar alloy and the like.

The elastic member 12 is a member having a substantially annular shape. The piezoelectric member 11 is adhered, at one surface thereof, to the elastic member 12 with a conductive adhesive or the like. A comb tooth portion 12a is formed on the other surface of the elastic member 12, by cutting a plurality of grooves in the other surface. The forward end surface (tip-end surface) of the comb tooth portion 12a is a frictional contact surface which is pressurized to make contact with the movable member 13 as described later on so that the movable member 13 is driven and rotated thereby. An epoxy resin film 17 is formed on the tip-end surface of the comb tooth portion 12a. The epoxy resin film 17 will be described later on.

The movable member 13 is a relative movement member which is pressurized to make contact with the elastic member 12 and which is frictionally driven by the progressive oscillatory wave. The movable member 13 is a member having a substantially annular shape formed of a light metal such as aluminum. An alumite coating layer 18 is formed on the movable member 13 as described later on.

The flexible printed circuit board 14 is a member for supplying a driving signal to the piezoelectric member 11, which is electrically connected to a predetermined electrode portion of the piezoelectric member 11. A control unit 8, which controls the camera 1, is connected to the flexible printed circuit board 14. In this embodiment, a temperature sensor 9 is connected to the control unit 8. The driving signal, which is to be supplied to the piezoelectric member 11, is adjusted depending on the sensing result obtained by the temperature sensor 9. In particular, in the case of the oscillatory wave motor 10 shown in FIG. 1, the frequency of the driving signal is adjusted depending on the sensed temperature condition so that the number of revolutions is constant (about 80 rpm).

The oscillatory wave motor 10 of the first embodiment will be explained in further detail below.

Figure 2:
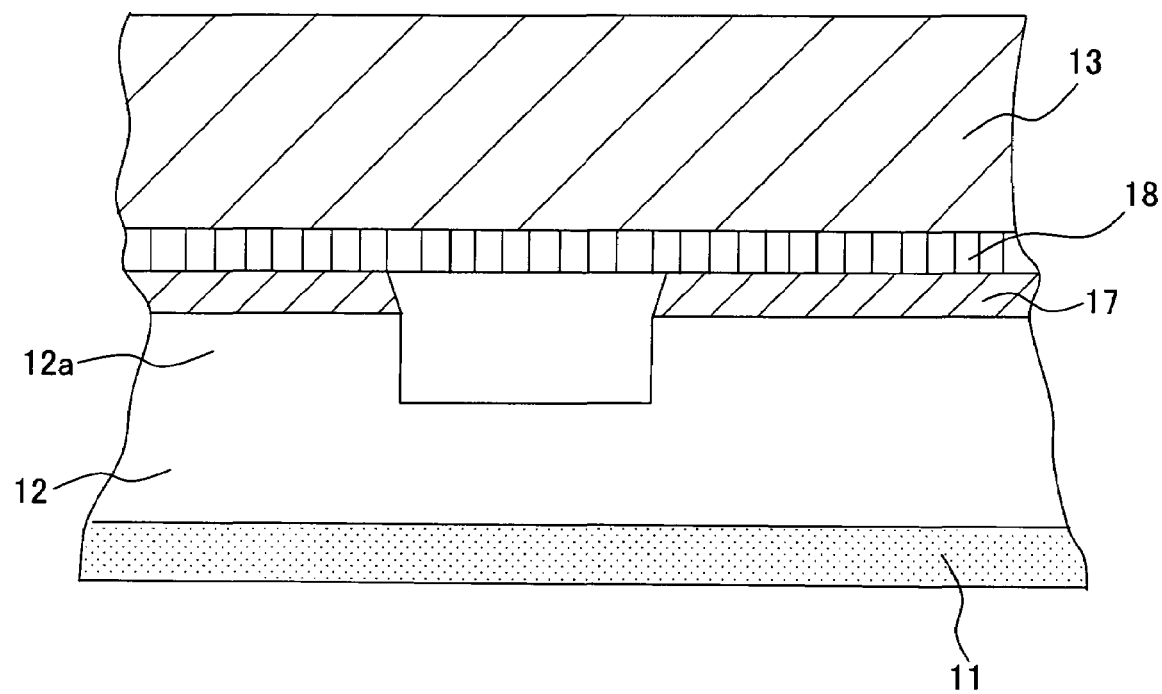
FIG. 2 shows a sectional view illustrating, in detail, frictional contact surfaces of an elastic member 12 and a movable member 13 of the oscillatory wave motor 10 according to the first embodiment.

FIG. 2 shows, in detail, the frictional contact surfaces of the elastic member 12 and the movable member 13 of the oscillatory wave motor 10 according to the first embodiment.

The elastic member 12 is formed of stainless steel (SUS 303). The epoxy resin film 17, which is formed by using an isocyanate curable type epoxy resin, is provided on the frictional contact surface with respect to the movable member 13. The movable member 13 is formed of aluminum alloy. An alumite coating layer 18 is formed on the frictional contact surface with respect to the elastic member 12. Therefore, the frictional contact surfaces of the oscillator (elastic member 12) and the movable member 13 have such a form that the epoxy resin film 17 and the alumite coating layer 18 make contact with each other.

The epoxy resin film 17 of this embodiment is formed of the isocyanate curable type epoxy resin containing 20% by weight of polytetrafluoroethylene (hereinafter referred to as "PTFE"), 10% by weight of acrylic beads having a particle size of 5 μm, and 3.5% by weight of conductive carbon. The maximum height roughness Rz (JIS B0601-2001) of the surface is 0.5 μm, and the film thickness is 30 μm.

As shown in FIG. 5, the epoxy resin film 17 of this embodiment is formed by performing the steps described below.

Figure 6:
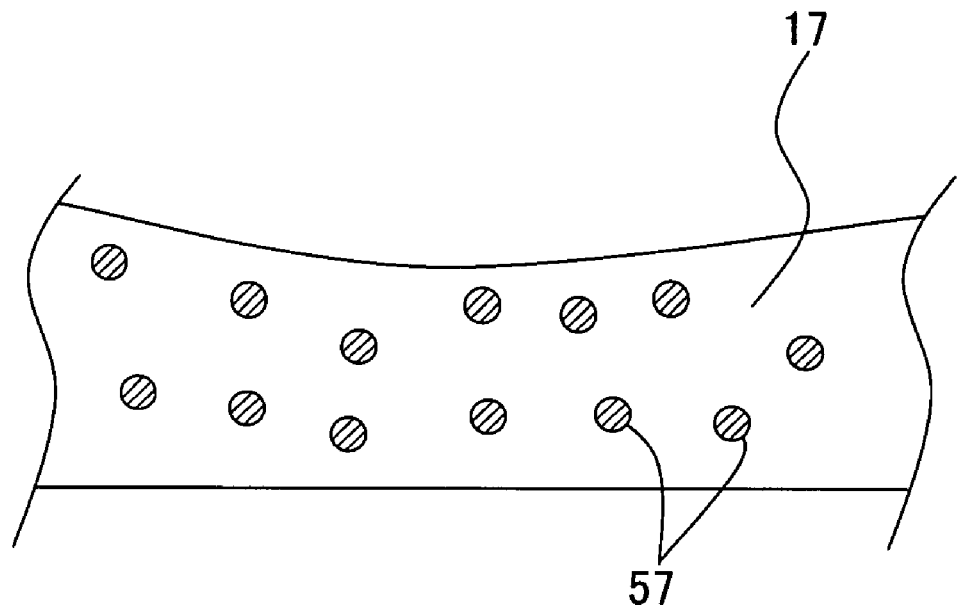
FIG. 6 shows a sectional view illustrating the epoxy resin film of the first embodiment before being polished.
Figure 7:
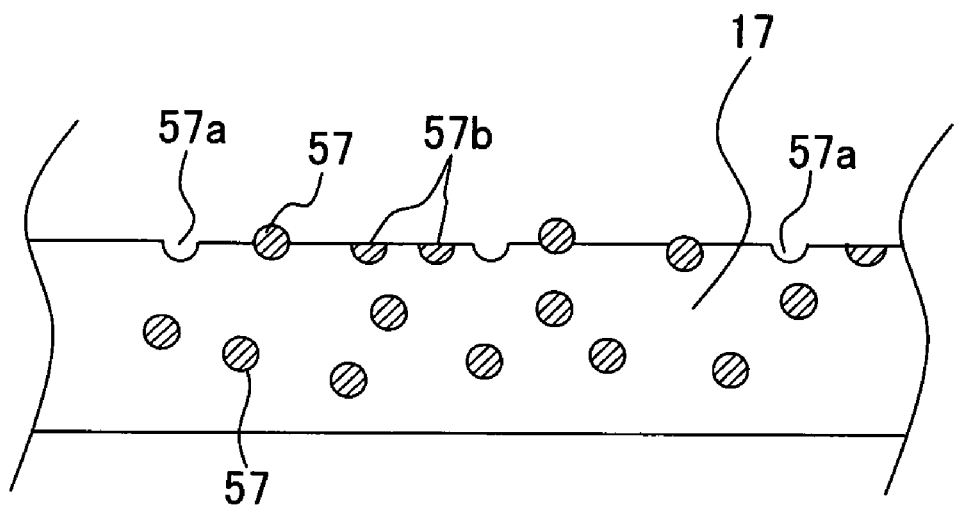
FIG. 7 shows a sectional view illustrating the epoxy resin film of the first embodiment after being polished.

At first, a primer is coated on the frictional contact surface (tip-end surface of the comb tooth portion 12a) of the elastic member 12, and the primer is dried. Further, a masking tape 55 is stuck to the adhesive portion of the piezoelectric member 11 on the surface opposite to the elastic member 12 to effect the masking (see FIG. 5A). Subsequently, a solution is prepared, in which the epoxy resin is mixed with additives such as an isocyanate curing agent for curing the epoxy resin, PTFE, the acrylic beads, the conductive carbon and the like, and a solvent such as thinner. The masking tape 55 is removed from the elastic member 12. The solution is coated on the frictional contact surface of the elastic member 12 (see FIG. 5B), followed by being left to stand for 60 minutes at a high temperature of about 180° C. to be dried and cured. FIG. 6 shows a cross section of the epoxy resin film 17 in this situation. As appreciated from FIG. 6, the surface of the epoxy resin film 17 is curved. However, after the curing, the central portion of the surface is polished to be flat by using green carborundum (see broken line shown in FIG. 5C). The circumferential edge portion of the epoxy resin film 17 is also inclined after performing the polishing, because the surface of the epoxy resin film 17 is curved before performing the polishing. Thus, the epoxy resin film 17, which has a substantially trapezoidal vertical cross-sectional shape, is formed (see FIG. 5D). In this embodiment, the particulate additive (acrylic beads 57) is used for the epoxy resin film 17. Therefore, those exposed on the surface of the epoxy resin film 17 after the polishing include spaces 57a from which the acrylic beads 57 are disengaged and missing, the surface (surface portions) from which the acrylic beads 57 protrude, and the cut-sectional surfaces (57b) of the acrylic beads 57 (see FIG. 7). As described above, in the case of the epoxy resin film 17 of this embodiment, the points or the surfaces of the acrylic beads 57 exposed on the surface make contact with the alumite coating layer 18 so that the frictional contact surface is prevented from being fixed or secured to the alumite coating layer 18.

On the other hand, the movable member 13 is formed of an aluminum alloy (A6061). The surface of the movable member 13 is subjected to the anodic oxidation, and thus the alumite coating layer 18 is formed on the surface of the movable member 13.

Figure 5A:
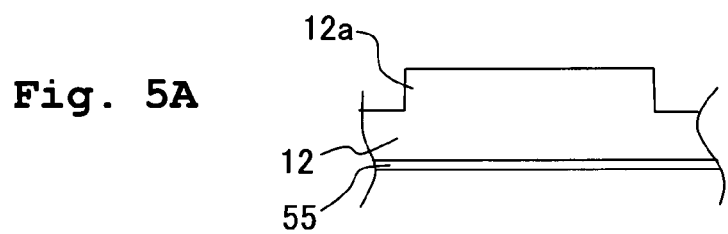
FIGS. 5A to 5F shows steps of producing an epoxy resin film according to the first embodiment.
Figure 5B:
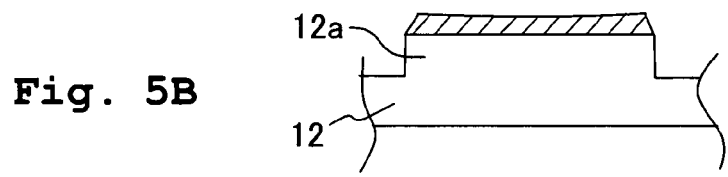
Figure 5C:
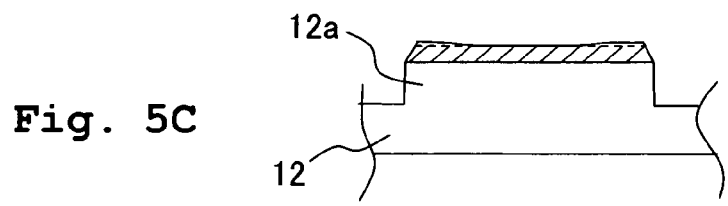
Figure 5D:
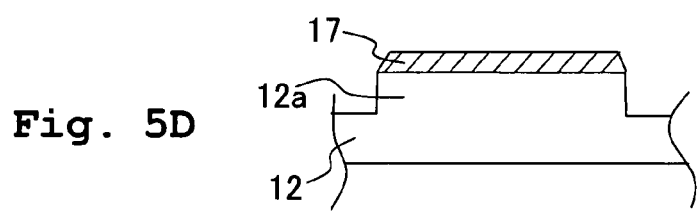
Figure 5E:
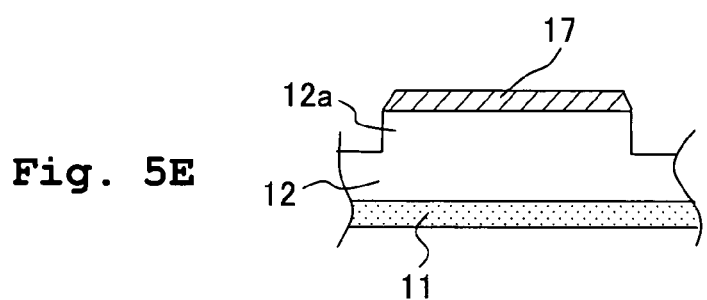
Figure 5F:
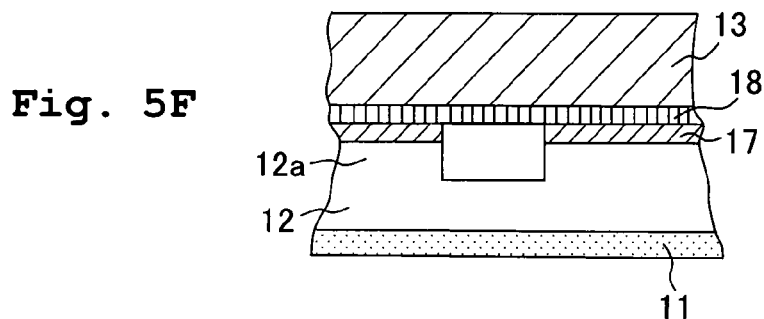

After that, the piezoelectric member 11 is adhered to a predetermined position of the elastic member 12 (see FIG. 5E). The movable member 13 is combined so that the alumite coating layer 18 makes contact with the epoxy resin layer 17 (see FIG. 5F).

The isocyanate curable type epoxy resin, which is used for the epoxy resin film 17 of this embodiment, is the epoxy resin in which isocyanate is added as a curing agent. The isocyanate curable type epoxy resin is excellent in the flexibility, the softness, the tight contact performance, the peel strength, the abrasion resistance, and the impact resistance as compared with a case in which another curing agent is added. Further, it is also possible to improve the hydrophobicity and the durability. When the hydrophobicity is improved, it is possible to avoid the dimensional change and the occurrence of the fixation or adhesion which would be otherwise caused by the absorption of the water in the air by the epoxy resin. Further, when the durability is improved, then the molecular structure is not changed even when the ultrasonic oscillation or vibration of the elastic member 12 is applied, and the deterioration or the like is hardly caused.

PTFE is a fixation-preventive agent which prevents the epoxy resin film 17 from being fixed or adhered with respect to the alumite coating layer 18. When PTFE is added to the epoxy resin film 17, an effect is obtained such that the start-up performance of the oscillatory wave motor is improved at low velocities.

The acrylic beads and the conductive carbon are frictional coefficient-increasing agents to increase the frictional coefficients of the frictional contact surfaces of the elastic member 12 and the movable member 13.

When the acrylic beads are added to the epoxy resin film 17, the frictional coefficient of the frictional contact surface is increased. The acrylic beads have such an effect that the holding torque (torque required to move the movable member from the state in which the position of the movable member is held or retained in the stationary state) is increased. In this embodiment, the acrylic beads are particulate, which have a particle size of 5 μm. The present invention is not limited to the use of acrylic beads. It is also possible to expect the effect to improve the holding torque even when particles of, for example, titanium, silicon, silicon carbide (SiC) or the like are used. However, the acrylic beads are used in this embodiment in consideration of, for example, the abrasion resistance.

The acrylic beads are particulate. Therefore, when the acrylic beads are added to the epoxy resin film 17, it is possible to provide such a form of contact in which the alumite coating layer 18 makes contact with the points or the circles (minute surfaces) of the acrylic beads contained in the epoxy resin film 17 (makes point contact or surface contact). It is possible to expect such an effect that the epoxy resin film 17 is prevented from being fixed to the alumite coating layer 18.

The conductive carbon has such an effect that the appearance of any abrasion powder is reduced, in addition to the same effect as that of the acrylic beads. The conductive carbon also has such an effect that the dust or the like is prevented from adsorption which would be otherwise caused by the static electricity. In this embodiment, the conductive carbon is used. However, there is no limitation thereto. It is also allowable to use, for example, carbon beads or beans and graphite.

When only the isocyanate curable type epoxy resin is coated on the frictional contact surface to form the coating film, an obtained oscillatory wave motor is improved in the start-up characteristic at low velocities, because of the low frictional coefficient between the elastic member and the movable member on the frictional contact surface. However, the idling tends to occur, and the driving efficiency is insufficient, because the holding torque is excessively low. Further, there is such a possibility that any fixation or adhesion may arise on the frictional contact surface.

On the other hand, the epoxy resin film 17, which contains PTFE, the acrylic beads, and the conductive carbon as described above, has the holding torque which is appropriate to be used as the oscillatory wave motor. Further, it is possible to avoid the fixation with respect to the alumite coating layer 18.

The epoxy resin film 17 requires no waste liquid processing unlike a case in which a Ni layer is formed on the frictional contact surface by, for example, the plating treatment, because the epoxy resin film 17 is formed by being coated on the elastic member 12. Further, it is possible to decrease the number of working steps by omitting, for example, the masking treatment and the surface treatment for the elastic member 12 having been hitherto required to adhere the piezoelectric member 11. Thus, it is possible to reduce the production cost.

The investigation has been made about the influences which are exerted, for example, on the driving performance of the oscillatory wave motor, for example, by the contents (% by weight) of PTFE, the acrylic beads, and the conductive carbon contained in the epoxy resin film 17, the particle size of the acrylic beads, the surface roughness of the epoxy resin film 17, and the like.

TABLE 1

Minimum number of revolutions [rpm] at temperature of −20° C. and load torque of 19.6 N · mm

| Acrylic beads [% by weight] | PTFE [% by weight] | | | | | | | |
|---|---|---|---|---|---|---|---|---|
| | 0 | 5 | 10 | 15 | 20 | 25 | 30 | 35 | 40 |
| 0 | 8 | 5 | 5 | 5 | 3 | 3 | 2 | 2 | 2 |
| 5 | 6 | 5 | 5 | 5 | 3 | 3 | 2 | 2 | 2 |
| 10 | 5 | 4 | 4 | 4 | 3 (First Embodiment) | 3 | 2 | 2 | 2 |
| 15 | 3 | 3 | 3 | 3 | 3 | 3 | 3 | 2 | 2 |
| 20 | 3 | 3 | 3 | 3 | 3 | 3 | 3 | 2 | 2 |
| 30 | 5 | 4 | 4 | 4 | 4 | 3 | 3 | 3 | 3 |
| 35 | 9 | 8 | 7 | 7 | 7 | 7 | 7 | 6 | 5 |

Table 1 shows the relationship between the minimum number of revolutions and the contents of the acrylic beads and PTFE contained in the isocyanate curable type epoxy resin for forming the epoxy resin film.

A plurality of oscillatory wave motors were prepared, which are mutually different in the amounts of the acrylic beads and PTFE contained in the isocyanate curable type epoxy resin for forming the epoxy resin film, although the plurality of oscillatory wave motors had approximately the same form as that of the oscillatory wave motor 10 of the first embodiment. The minimum number of revolutions was measured when the driving operation was performed at a temperature of −20° C. and a load torque of 19.6 N·mm (200 gf·cm).

The term "minimum number of revolutions" herein refers to the minimum number of revolutions at which the oscillatory wave motor can be driven. It is affirmed that as the value of the minimum number of revolutions is smaller, the driving operation can be performed at a lower velocity, and the start-up characteristic is more satisfactory. Also, there is such a tendency that the start-up characteristic is deteriorated at lower temperatures. Therefore, the measurement was performed at the temperature of −20° C.

The minimum number of revolutions was 10 to 30 rpm when a conventional oscillatory wave motor, in which the frictional contact surface of the movable member was formed of an alumite coating layer and the frictional contact surface of the elastic member was formed of an electroless nickel-phosphorus plating layer (hereinafter referred to as "electroless Ni—P plating layer"), was driven at a temperature of −20° C. and a load torque of 19.6 N·mm.

However, as shown in Table 1, when the isocyanate curable type epoxy resin was coated on the frictional contact surface of the elastic member, the minimum number of revolutions at the temperature of −20° C. was 8 rpm, wherein the start-up characteristic was improved as compared with the conventional oscillatory wave motor. When the epoxy resin film was provided such that the acrylic beads and PTFE were added to the isocyanate curable type epoxy resin, the minimum number of revolutions was further decreased, and the start-up characteristic was further improved.

As for PTFE, when the content of the acrylic beads was constant, PTFE was effective to decrease the minimum number of revolutions when the amount of PTFE was larger. On the other hand, when the content of PTFE was constant, if the content of the acrylic beads exceeded 30% by weight, then the minimum number of revolutions began to suddenly increase.

Therefore, according to the result shown in Table 1, it is preferable that the epoxy resin film, which is formed of the isocyanate curable type epoxy resin, has the content of the acrylic beads of not more than 30% by weight in order to improve the start-up characteristic at the low velocity.

In the case of the oscillatory wave motor 10 of the first embodiment, the content of the acrylic beads contained in the epoxy resin film 17 is 10% by weight, and the content of PTFE is 20% by weight, wherein the contents are within the preferred ranges to improve the start-up characteristic at the low velocity.

TABLE 2

Situations of occurrence of fixation between oscillator and movable member after storage for 100 hours in environment of temperature of 70° C. and humidity of 95%.

| Acrylic beads [% by weight] | PTFE [% by weight] | | | | | |
|---|---|---|---|---|---|---|
| | 0 | 5 | 10 | 15 | 20 | 25 | 30 |
| 0 | NG | OK | OK | OK | OK | OK | OK |
| 5 | OK | OK | OK | OK | OK | OK | OK |
| 10 | OK | OK | OK | OK | OK (First Embodiment) | OK | OK |
| 15 | OK | OK | OK | OK | OK | OK | OK |
| 20 | OK | OK | OK | OK | OK | OK | OK |

Fixation OK: not appeared
NG: appeared

Table 2 shows the relationship between the appearance situation of the fixation between the oscillator (elastic member) and the movable member and the contents of the acrylic beads and PTFE contained in the isocyanate curable type epoxy resin for forming the epoxy resin film.

A plurality of oscillatory wave motors were prepared, which are mutually different in the amounts of the acrylic beads and PTFE contained in the isocyanate curable type epoxy resin for forming the epoxy resin film, although the plurality of oscillatory wave motors had approximately the same form as that of the oscillatory wave motor 10 of the first embodiment. The investigation was made about the appearance of the fixation when the respective oscillatory wave motors were stored for 100 hours in an environment of a temperature of 70° C. and a relative humidity of 95%.

If the fixation arises on the frictional contact surface between the movable member and the oscillator, the fixation causes the factor to deteriorate the driving performance, for example, such that the oscillatory wave motor is not driven and/or the large current is required for the driving operation. Therefore, it is desired that no fixation appears on the frictional contact surface even when the oscillatory wave motor is placed for a long period of time in a high temperature and high humidity environment.

As shown in Table 2, when the acrylic beads and PTFE were not added to the isocyanate curable type epoxy resin, the fixation was caused. However, when the acrylic beads and PTFE were contained in amounts of not less than 5% by weight, it is possible to avoid the occurrence of the fixation even in the high temperature and high humidity environment in which the fixation tends to arise.

When PTFE as the fixation-preventive agent was not contained, and only the acrylic beads were contained in an amount of not less than 5% by weight, then the effect of the prevention of the fixation was exhibited. This is the effect based on the fact that the acrylic beads, which are contained in the epoxy resin film, behave as the points or the circles (minute surfaces) to make contact with the alumite coating layer of the movable member.

In the case of the oscillatory wave motor 10 of the first embodiment, the isocyanate curable type epoxy resin, which forms the epoxy resin film 17, contains PTFE in an amount of 20% by weight and the acrylic beads in an amount of 10% by weight. The oscillatory wave motor 10 of the first embodiment satisfies the condition of the preferred contents in view of the prevention of the fixation.

TABLE 3

Contents of PTFE and acrylic beads and holding torque

| Acrylic beads [% by weight] | PTFE [% by weight] | | | | | | |
|---|---|---|---|---|---|---|---|
| | 0 | 5 | 10 | 20 | 30 | 35 | 40 |
| 0 | OK | OK | OK | OK | OK | OK | NG |
| 5 | OK | OK | OK | OK | OK | OK | NG |
| 10 | OK | OK | OK | OK (First Emdodiment) | OK | OK | NG |
| 20 | OK | OK | OK | OK | OK | OK | OK |
| 30 | OK | OK | OK | OK | OK | OK | OK |

OK: not less than prescribed value
NG: not more than 80% of prescribed value

Table 3 shows the relationship between the holding torque and the contents of the acrylic beads and PTFE contained in the isocyanate curable type epoxy resin for forming the epoxy resin film.

A plurality of oscillatory wave motors were prepared, which are mutually different in the amounts of the acrylic beads and PTFE contained in the isocyanate curable type epoxy resin for forming the epoxy resin film, although the plurality of oscillatory wave motors had approximately the same form as that of the oscillatory wave motor 10 of the first embodiment. The investigation was made for whether or not a prescribed value of the holding torque was satisfied when the driving operation was performed at a driving voltage of AC 30 V and a number of revolutions of 60 rpm.

The prescribed value of the holding torque shown in Table 3 refers to a value of the holding torque which is required when the oscillatory wave motor is used as the driving source for driving the optical system for the lens barrel of the camera as shown by the oscillatory wave motor 10 of this embodiment. The prescribed value of the holding torque required for the oscillatory wave motor 10 of the first embodiment is 150 N·mm.

As shown in Table 3, when only the isocyanate curable type epoxy resin was coated on the frictional contact surface of the elastic member, the holding torque, which was not less than the prescribed value, was obtained. When PTFE and the acrylic beads were added to the isocyanate curable type epoxy resin, the holding torque, which was not less than the prescribed value, was also obtained.

However, when the content of the acrylic beads was not more than 10% by weight, if the content of PTFE exceeded 35% by weight, then the holding torque was not more than 80% of the prescribed value.

Therefore, according to the result shown in Table 3, it has been revealed that the amount of PTFE contained in the isocyanate curable type epoxy resin is preferably not more than 35% by weight in order to improve the holding torque.

In the case of the oscillatory wave motor 10 of the first embodiment, the content of PTFE is 20% by weight, and the content of the acrylic beads is 10% by weight. Therefore, the oscillatory wave motor 10 of the first embodiment satisfies the condition of the preferred contents to improve the holding torque.

TABLE 4

Rate of change of input current after 50,000 revolutions

|  | Load torque [N·mm] | Driving times for measuring durability | Rate of change of input current |
|---|---|---|---|
| Conventional oscillatory wave motor (electroless Ni—P plating layer) | 19.6 58.8 | 50,000 50,000 | +10% +40% |
| Oscillatory wave motor of first embodiment (epoxy resin film) | 19.8 58.8 | 50,000 50,000 | +5% +9% |

Table 4 shows the comparison between the oscillatory wave motor 10 of the first embodiment and a conventional oscillatory wave motor in relation to the rate of change of the input current value after 50,000 revolutions.

The conventional oscillatory wave motor has an approximately same form as that of the oscillatory wave motor 10 of the first embodiment, except that an electroless Ni—P plating layer is formed on the frictional contact surface of the elastic member.

The oscillatory wave motor 10 of the first embodiment and the conventional oscillatory wave motor were rotated 50,000 revolutions under the same condition, and the investigation was made about the rate of change of the input current value before and after the rotation. The measurement was performed for two conditions of the load torque during the rotation of 19.6 N·mm (200 gf·cm) and 58.8 N·mm (600 gf·cm). The number of revolutions during the measurement was 60 rpm.

The input current value herein refers to a current value at which the oscillatory wave motor begins to rotate in the state in which each of the load torques is applied. The rate of change of the input current value or the input current value change rate is the rate of change of the input current value obtained before and after the rotation of 50,000 revolutions in this measurement. Usually, when the driving operation is performed for a long period of time or the like, the rate of change of the input current value is increased, because the frictional contact surface is roughened. Further, there is such a tendency that as the load torque is larger, the rate of change becomes larger.

Therefore, the smaller rate of change of the input current value indicates the fact that the durability of the oscillatory wave motor is more satisfactory. Even when the load torque is large, it is preferable that the rate of change of the input current value is small in view of the durability.

As shown in Table 4, in the case of the conventional oscillatory wave motor, the input current value change rate is +10% when the load torque is 19.6 N·mm. The input current value change rate is +40% when the load torque is 58.8 N·mm. The input current value change rate is greatly increased at each of the load torques. The input current value change rate is large as well, when the load torque is increased.

However, in the case of the oscillatory wave motor 10 of the first embodiment, the input current value change rate is +5% when the load torque is 19.6 N·mm. The input current value change rate is +9% when the load torque is 58.8 N·mm. The input current value change rate is small at each of the load torques. The input current value change rate is small as well, when the load torque is increased.

Therefore, when the epoxy resin film 17 of this embodiment is formed, then the rate of change of the input current value is decreased after performing the driving rotation of 50,000 revolutions, and the durability of the oscillatory wave motor is improved.

TABLE 5

Abrasion depth after 50,000 revolutions

|  | Abrasion depth [μm] of frictional contact surface |
|---|---|
| Conventional oscillatory wave motor (electroless Ni—P plating layer) | 3 |
| Oscillatory wave motor of first embodiment (epoxy resin film) | 0.8 |

Table 5 shows the comparison between the oscillatory wave motor 10 of the first embodiment and a conventional oscillatory wave motor in relation to the amount of abrasion of the frictional contact surface of the elastic member.

The conventional oscillatory wave motor has approximately the same form as that of the oscillatory wave motor 10 of the first embodiment except that an electroless Ni—P plating layer is formed on the frictional contact surface of the elastic member.

The oscillatory wave motor 10 of the first embodiment and the conventional oscillatory wave motor were rotated at a load torque of 20 N·mm and a number of revolutions of 60 rpm to measure the abrasion amount of the frictional contact surface of the elastic member as the abrasion depth after they were rotated 50,000 revolutions.

The abrasion depth is herein referred to such that the difference from the thickness of the elastic member after the driving rotation is determined on the basis of the thickness of the elastic member before being rotated 50,000 revolutions, and the difference is indicated as the depth caused by the abrasion. Therefore, when the value of the abrasion depth is smaller, it is indicated that the abrasion amount caused by the driving is smaller, and the durability is more satisfactory.

As shown in Table 5, in the case of the conventional oscillatory wave motor, the abrasion depth of 3 μm was brought about by being rotated 50,000 revolutions. On the contrary, the generated abrasion depth was 0.8 μm in the case of the oscillatory wave motor 10 of the first embodiment.

Therefore, when the epoxy resin film 17 of this embodiment is formed on the frictional contact surface of the elastic member 12, then the abrasion amount is decreased, and it is possible to improve the durability.

TABLE 6

Thickness of epoxy resin film (main agent: isocyanate curable type epoxy resin) and presence or absence of fixation

| Thickness [μm] | Presence or absence of occurrence of fixation |
|---|---|
| 10 | OK |
| 20 | OK |
| 30 (first embodiment) | OK |
| 40 | OK |
| 50 | OK |
| 60 | OK |
| 70 | NG |

OK: fixation not appeared
NG: fixation appeared

Table 6 shows the relationship between the film thickness of the epoxy resin film and the occurrence of the fixation.

Seven oscillatory wave motors were prepared, in which only the thickness of the epoxy resin film differed within a range from 10 to 70 μm in a unit of 10 μm, although the oscillatory wave motors had approximately the same form as that of the oscillatory wave motor 10 of the first embodiment. The investigation was made about the appearance situation of the fixation between the epoxy resin film of the elastic member and the alumite coating layer of the movable member when the oscillatory wave motors were stored for 100 hours in an environment of a temperature of 70° C. and a humidity of 95%.

As shown in Table 6, the fixation was not caused when the thickness of the epoxy resin film was not more than 60 μm. However, the fixation was caused when the thickness of the epoxy resin film was not less than 70 μm. The fixation deteriorates the start-up characteristic and the driving performance of the oscillatory wave motor. Therefore, it is preferable that the film thickness of the epoxy resin film is not more than 60 μm in order to avoid the fixation and to improve the start-up characteristic and the driving performance.

In the case of the oscillatory wave motor 10 of the first embodiment, the thickness of the epoxy resin film 17 is 30 μm. The oscillatory wave motor 10 of the first embodiment satisfies the condition of the preferred film thickness for the prevention of the fixation.

TABLE 7

Particle size of acrylic beads and rate of change of input current minimum value

| Particle size [μm] | Rate of change of input current minimum value after driving for 1 hour |
|---|---|
| 1 | not more than 5% |
| 5 (first embodiment) | not more than 5% |
| 7 | 8% |

Table 7 shows the relationship between the particle size of the acrylic beads and the rate of change of the input current minimum value.

Three oscillatory wave motors were driven for 1 hour, which are different in the particle size of the acrylic beads added to the isocyanate curable type epoxy resin as 1 μm, 5 μm, and 7 μm, although the oscillatory wave motors had approximately the same form as that of the oscillatory wave motor 10 of the first embodiment. The investigation was made about the rate of change of the input current minimum value before the driving and after the driving.

The oscillatory wave motor exhibits such a tendency that when the frequency is increased upon the driving, the current value is also increased; but that when the frequency arrives at a certain point, then the current value is lowered to become the minimum value, and the current value is increased again. The input current minimum value means a current value obtained when the minimum value is provided. In this measurement, the input current minimum value change rate means a rate of change of the input current minimum value before and after the driving for 1 hour. It is affirmed that as the rate of change is smaller, the driving is performed more stably.

As shown in Table 7, when the particle size of the acrylic beads was 7 μm, the input current minimum value change rate was 8% after the driving for 1 hour. However, when the particle size of the acrylic beads was not more than 5 μm, the change rate was not more than 5%. Therefore, it is preferable that the particle size of the acrylic beads is not more than 5 μm in view of the execution of the stable driving.

In the case of the oscillatory wave motor 10 of the first embodiment, the particle size of the acrylic beads added to the isocyanate curable type epoxy resin is 5 μm. It is thus possible to perform the stable driving.

TABLE 8

Situation of occurrence of fixation for oscillator and movable member after storage for 100 hours in environment of temperature of 70° C. and humidity of 95%

| Acrylic beads diameter [μm] | PTFE [wt. %] | | |
|---|---|---|---|
| | 0 | 10 | 20 |
| 1 | OK | OK | OK |
| 5 | OK | OK | OK |
| 7 | OK | OK | OK |

OK: fixation not appeared
NG: fixation appeared

Table 8 shows the relationship between the particle size of the acrylic beads and the occurrence of the fixation.

Oscillatory wave motors were prepared, in which the amount of PTFE and the particle size of the acrylic beads added to the isocyanate curable type epoxy resin differed, although the oscillatory wave motors had approximately the same form as that of the oscillatory wave motor 10 of the first embodiment. The investigation was made about the appearance of the fixation when the respective oscillatory wave motors were stored for 100 hours in an environment of a temperature of 70° C. and a relative humidity of 95%.

As shown in Table 8, it is possible to avoid the occurrence of the fixation when the acrylic beads are added irrelevant to the presence or absence of PTFE. According to the result shown in Table 7, it is preferable that the particle size of the acrylic beads is made to be small in view of the stable driving. However, according to the result shown in Table 8, there is no special limitation for the particle size of the acrylic beads in view of the prevention of the fixation of the frictional contact surface.

In the case of the oscillatory wave motor 10 of the first embodiment, the acrylic beads of 5 μm are added to the isocyanate curable type epoxy resin. It is possible to avoid the occurrence of the fixation, and it is possible to perform the stable driving.

TABLE 9

Content of conductive carbon and maximum load torque

| Conductive carbon [% by weight] | Maximum load torque measured value/ prescribed value | Judgment |
|---|---|---|
| 1 | 0.7 | NG |
| 2 | 1 (prescribed value) | OK |
| 5 | 1.3 | OK |
| 8 | 1.5 | OK |
| 10 | 1.2 | OK |
| 11 | 0.9 | ALW |

OK: good,
ALW: allowable,
NG: no good

Table 9 shows the relationship between the content of the conductive carbon and the maximum load torque.

Six oscillatory wave motors were prepared, which are different in the amount of the conductive carbon contained in the isocyanate curable type epoxy resin for forming the epoxy resin film 17, although the oscillatory wave motors had approximately the same form as that of the oscillatory wave motor 10 described in the first embodiment. The maximum value of the load torque at which the driving was successfully performed (hereinafter referred to as "maximum load torque") was determined. In Table 9, the oscillatory wave motor, which had the content of the conductive carbon of 2% by weight, was designated as the reference. The maximum load torque thereof is regarded as a prescribed value of the maximum load torque at least required to drive the lens group by using the oscillatory wave motor. The ratio between the measured value and the prescribed value of the maximum load torque was determined for each of the oscillatory wave motors. The ratio of the measured value of the maximum load torque with respect to the prescribed value is preferably not less than 1. However, the ratio of not less than 0.9 was regarded to be within an allowable range.

As shown in Table 9, the following fact was revealed. That is, when the content of the conductive carbon was 1% by weight, the ratio of the measured value of the maximum load torque with respect to the prescribed value was 0.7, which was not suitable for the use as the oscillatory wave motor. On the other hand, when the content of the conductive carbon was 11% by weight, the ratio of the measured value of the maximum load torque with respect to the prescribed value was 0.9 which was within the allowable range but which was lower than the prescribed value.

Therefore, when the content of the conductive carbon is 2 to 10% by weight, it is possible to increase the maximum load torque, which in turn is effective to improve the driving performance.

In the case of the oscillatory wave motor 10 of the first embodiment, the amount of the conductive carbon contained in the isocyanate curable type epoxy resin is 3.5% by weight. The oscillatory wave motor 10 of the first embodiment satisfies the condition of the content which is effective to improve the maximum load torque.

TABLE 10

Surface roughness of epoxy resin film (main agent: isocyanate curable type epoxy resin) and rate of change of input current minimum value

| Treatment | Maximum height roughness Rz [μm] | Change rate of input current minimum value after driving for 1 hour |
|---|---|---|
| polish with waterproof paper #400 | 1.1 | about 10% |
| polish with waterproof paper# 800 | 0.9 | not more than 5% |
| polish with GC #1000 | 0.7 | not more than 5% |
| polish with GC #2000 | 0.6 | not more than 5% |
| polish with GC #4000 | 0.5 | not more than 5% |

*GC: abbreviation of green carborundum

Table 10 shows the relationship between the surface roughness of the epoxy resin film and the rate of change of the input current minimum value.

As shown in Table 10, five oscillatory wave motors were prepared, which are different in the surface roughness of the epoxy resin film, although the oscillatory wave motors had approximately the same form as that of the oscillatory wave motor 10 described in the first embodiment. The investigation was made about the rate of change of the input current minimum value after the driving for 1 hour.

The surface roughness is indicated by the maximum height roughness Rz (JIS B0601-2001). The maximum height roughness Rz is a sum of the maximum value of a peak height and the maximum value of a valley depth of a contour curve in relation to a reference length.

As shown in Table 10, when the maximum height roughness Rz exceeded 1 μm, the rate of change of the input current minimum value after the driving for 1 hour was about 10%. However, when the maximum height roughness Rz was not more than 1 μm, the rate of change was not more than 5%. Therefore, the following fact has been revealed for the surface roughness of the epoxy resin film 17. That is, it is desirable that the maximum height roughness Rz is not more than 1 μm in view of the execution of the stable driving.

In the case of the oscillatory wave motor 10 of the first embodiment, the maximum height roughness Rz of the surface of the epoxy resin film 17 is 0.5 μm. It is thus possible to perform the stable driving.

According to the results shown in Tables 1 to 10, it is preferable to provide the amounts of the respective additives contained in the isocyanate curable type epoxy resin for forming the epoxy resin film as follows, in view of the improvement in the start-up characteristic at the low velocity, the prevention of the fixation, the improvement in the holding torque, and the improvement in the maximum load torque. That is, PTFE is 5 to not more than 35% by weight, the acrylic beads are 5 to not more than 30% by weight, and the conductive carbon is 2 to not more than 10% by weight.

Further, it is preferable that the particle size of the acrylic beads is not more than 5 µm, in view of the realization of the stable driving.

Further, the thickness of the epoxy resin film is preferably not more than 60 µm, in view of the prevention of the fixation. As for the surface roughness of the epoxy resin film, the maximum height roughness Rz is not more than 1 µm in view of the realization of the stable driving.

In the case of the oscillatory wave motor 10 of the first embodiment, the isocyanate curable type epoxy resin is used for the epoxy resin film 17. Further, the oscillatory wave motor 10 of the first embodiment contains PTFE in an amount of 20% by weight, the acrylic beads in an amount of 10% by weight, and the conductive carbon in an amount of 3.5% by weight. The oscillatory wave motor 10 of the first embodiment satisfies the conditions described above.

When the oscillatory wave motor 10 of the first embodiment was driven, the following effects were obtained as compared with the conventional oscillatory wave motor.

(1) The abrasion amount of the frictional contact surface is extremely small. Therefore, the abrasion powder is scarcely generated, and the shape of the elastic member 12 is not deformed.

(2) The stable frictional driving is obtained over a long period of time.

(3) Any abnormal sound, generated during the frictional driving, is small.

(4) The start-up characteristic at a low velocity is satisfactory in a low temperature environment, wherein the start-up characteristic is satisfactory in a temperature range of –40° C. to 80° C., and the start-up characteristic is especially satisfactory in a temperature range of –20° C. to 60° C.

(5) The current value is scarcely changed after the driving for a long period of time at a high load, and it is possible to obtain the stable driving.

(6) It is unnecessary to perform, for example, the masking processing step, the adhering step of any formed product of resin or the like, and the discarding treatment for any surface treatment solution. Accordingly, it is possible to shorten the operation steps and operation time, and to decrease the production cost, and the like.

Second Embodiment

An oscillatory wave motor of a second embodiment is different from the oscillatory wave motor 10 described in the first embodiment in the film thickness, the additive, the material to serve as the main agent for the epoxy resin film 17, and the like. Therefore, the portions, which function in the same manner as those of the first embodiment described above, are designated by the same reference numerals, any duplicate explanation of which will be appropriately omitted.

An epoxy resin film 17 of this embodiment is formed of an epoxy resin which contains 20% by weight of PTFE, 10% by weight of silicon beads having a particle size of 6 µm, and 3.5% by weight of conductive carbon and which is blended with a phenol resin as a curable prepolymer. The maximum height roughness Rz (JIS B0601-2001) of a surface of the epoxy resin film 17 is 0.4 µm, and the film thickness is 30 µm.

The epoxy resin film 17 of the second embodiment is formed by performing approximately the same steps as those of the epoxy resin film 17 of the first embodiment described above.

At first, a primer is coated on a frictional contact surface (tip-end surface of the comb tooth portion 12a) of the elastic member 12, followed by being dried. Subsequently, the epoxy resin, to which the phenol resin is blended as the curable prepolymer, is mixed with additives such as PTFE, the silicon beads, the conductive carbon and the like, and the solvent such as thinner to prepare a solution. The solution is coated on the frictional contact surface of the elastic member 12, followed by being left to stand for 60 minutes at a high temperature of about 185° C. so that the solution is dried and cured. After the curing, the surface is polished with green carborundum to form the epoxy resin film 17 of this embodiment.

The term "prepolymer" herein refers to a low molecular weight polymer having a relatively small molecular weight of about 300 to 8,000, and is the prepolymerization product of the thermosetting resin (polymerization product produced by stopping the polymerization reaction or the condensation polymerization reaction). The prepolymer can be handled relatively easily, and is used as a curing component.

In this specification and claims, the term "curable prepolymer" refers to a prepolymer which causes the cross-linking reaction when the prepolymer is heated together with the epoxy resin. In the following description and claims, the same definition is to be used.

The epoxy resin (hereinafter referred to as "epoxy-phenol resin"), which is used for the epoxy resin film 17 of the second embodiment and which is obtained by blending the phenol resin as the curable prepolymer, is excellent in the hardness, the tight contact performance, the peel strength, the abrasion resistance, the heat resistance, and the chemical resistance as compared with a case in which any other resin is blended. Further, it is also possible to improve the hydrophobicity and the durability by using the epoxy resin film 17 of this embodiment.

When the epoxy resin is cured and dried in combination with any resin having the phenolic hydroxyl group and/or the methylol group including, for example, the phenol resin, the urea resin, and the melamine resin, then the epoxy group of the epoxy resin is reacted with the hydroxyl group of the added phenol resin or the like to form the ether bond. When the condensation is advanced for the added phenol resin or the like, the network structure is formed. Therefore, the coating film is hardened. The epoxy resin film 17, which uses the epoxy-phenol resin as described in this embodiment, is harder than a coating film using any other epoxy resin. It is thus possible to improve the abrasion resistance of the frictional contact surface by using the epoxy resin film 17 of this embodiment.

Further, it is possible to improve the durability of the epoxy resin film, because the epoxy-phenol resin is excellent in the tight contact performance and the peel strength.

When the heat resistance is improved by using the epoxy-phenol resin, it is possible to avoid any denaturation or alteration of the quality of the epoxy resin film 17 which would be otherwise caused by the frictional heat. Further, when the chemical resistance is improved by using the epoxy-phenol resin, it is possible to avoid any chemical denaturation or alteration of the quality which would be otherwise caused by a minute amount of sulfuric acid contained in the alumite coating layer 18 with which the epoxy resin film 17 makes the frictional contact.

PTFE and the silicon beads are fixation-preventive agents which prevent the epoxy resin film 17 from being fixed or adhered to the alumite coating layer 18. The silicon beads are particulate. Therefore, when the silicon beads are added to the epoxy resin film 17, it is possible to provide such a form that the alumite coating layer 18 makes contact with the points or the circles (minute surfaces) of the silicon beads contained in the epoxy resin film 17. It is thus possible to expect such an effect that the epoxy resin film 17 is prevented from being fixed to the alumite coating layer 18.

Further, PTFE has such an effect that the start-up performance of the oscillatory wave motor is improved at a low velocity when PTFE is added to the epoxy resin film 17. The silicon beads have such an effect that the water resistance and the heat resistance of the epoxy resin film 17 are improved.

The conductive carbon is the frictional coefficient-increasing agent for increasing the frictional coefficient of the frictional contact surface between the elastic member 12 and the movable member 13. The conductive carbon also has such an effect that the appearance of the abrasion powder is reduced, and the dust or the like is prevented from adsorbing which would be otherwise caused by the static electricity. In this embodiment, the conductive carbon is used as the frictional coefficient-increasing agent. However, there is no limitation thereto. It is also allowable to use, for example, carbon beads and graphite.

As for the frictional coefficient-increasing agent, it is possible to expect an effect to improve the holding torque even when particles of, for example, titanium, silicon, or silicon carbide (SiC) are used as described in the first embodiment. However, in this embodiment, the conductive carbon is used in consideration of the abrasion resistance and the static electricity-preventive effect.

In the case of an oscillatory wave motor in which a coating film is formed by applying, to the frictional contact surface, an epoxy resin in which the phenol resin is not blended, there is such a possibility that the fixation may be caused on the frictional contact surface due to the anchor effect brought about by the minute concave/convex shape of the contact surface between the elastic member and the movable member on the frictional contact surface.

Further, the epoxy resin film 17 of the second embodiment, which contains PTFE, the silicon beads, and the conductive carbon as described above, has the holding torque which is appropriate to be used as the oscillatory wave motor. Further, it is possible to avoid the fixation with respect to the alumite coating layer 18.

Furthermore, the epoxy resin film 17 of the second embodiment requires no waste liquid processing unlike the case in which the Ni layer is formed on the frictional contact surface by, for example, the plating treatment, because the epoxy resin film 17 of the second embodiment is formed by being coated on the elastic member 12, in the same manner as in the first embodiment. Moreover, it is possible to decrease the number of working steps by omitting, for example, the masking treatment and the surface treatment for the elastic member 12 having been hitherto required to adhere the piezoelectric member 11. It is thus possible to reduce the production cost.

The investigation has been made about the influences which are exerted, for example, on the driving performance of the oscillatory wave motor, for example, by the contents (% by weight) of PTFE, the silicon beads, and the conductive carbon contained in the epoxy resin film 17 of the second embodiment, the particle size of the silicon beads, and the surface roughness of the epoxy resin film 17.

TABLE 11

Minimum number of revolutions [rpm] at temperature of −20° C. and load torque of 19.6 N · mm

| Silicon beads [% by weight] | PTFE [% by weight] | | | | | | | |
|---|---|---|---|---|---|---|---|---|
| | 0 | 5 | 10 | 15 | 20 | 25 | 30 | 35 | 40 |
| 0 | 7 | 6 | 6 | 5 | 4 | 4 | 3 | 3 | 2 |
| 5 | 6 | 6 | 5 | 5 | 4 | 3 | 3 | 2 | 2 |
| 10 | 6 | 5 | 4 | 4 | 3 (Second Embodiment) | 3 | 2 | 2 | 2 |
| 15 | 5 | 5 | 4 | 4 | 3 | 3 | 3 | 2 | 2 |
| 20 | 5 | 4 | 4 | 3 | 3 | 3 | 3 | 2 | 2 |
| 25 | 9 | 8 | 8 | 7 | 7 | 7 | 7 | 6 | 6 |

Table 11 shows the relationship between the minimum number of revolutions and the contents of the silicon beads and PTFE contained in the epoxy-phenol resin for forming the epoxy resin film.

A plurality of oscillatory wave motors were prepared, which are mutually different in the amounts of the silicon beads and PTFE contained in the epoxy-phenol resin for forming the epoxy resin film, although the plurality of oscillatory wave motors had approximately the same form as that of the oscillatory wave motor of the second embodiment. The minimum number of revolutions was measured when the driving operation was performed at a temperature of −20° C. and a load torque of 19.6 N·mm (200 gf·cm).

The minimum number of revolutions was 10 to 30 rpm when a conventional oscillatory wave motor, in which the frictional contact surface of the movable member was formed of an alumite coating layer and the frictional contact surface of the elastic member was formed of an electroless Ni—P plating layer, was driven at a temperature of −20° C. and a load torque of 19.6 N·mm.

On the other hand, as shown in Table 11, when the epoxy-phenol resin was coated on the frictional contact surface of the elastic member, the minimum number of revolutions at the temperature of −20° C. was 7 rpm, wherein the start-up characteristic was improved as compared with the conventional oscillatory wave motor. The minimum number of revolutions was further decreased, and the start-up characteristic was further improved, when the epoxy resin film was provided such that the silicon beads and PTFE were added to the epoxy-phenol resin.

Further, although the result was not expressed on the measured values shown in Tables 1 and 11, the number of revolutions of the oscillatory wave motor 10 scarcely underwent the unevenness during the driving, and the stable driving was obtained, when the epoxy resin film 17 using the epoxy-phenol resin of the second embodiment was used, as compared with the case in which the epoxy resin film 17 of the first embodiment using the isocyanate curable type epoxy resin was used.

As for PTFE, on condition that the content of the silicon beads was constant, PTFE was effective to decrease the minimum number of revolutions when the content of PTFE was larger. On the other hand, on condition that the content of PTFE was constant, when the content of the silicon beads exceeded 25% by weight, the minimum number of revolutions began to suddenly increase.

Therefore, according to the result shown in Table. 11, it is preferable that the epoxy resin film, which is formed by using the epoxy-phenol resin, has the content of the silicon beads of not more than 20% by weight in order to improve the start-up characteristic at the low velocity.

In the case of the oscillatory wave motor 10 of the second embodiment, the content of the silicon beads contained in the epoxy resin film 17 is 10% by weight, and the content of PTFE is 20% by weight, wherein the contents are within the preferred ranges to improve the start-up characteristic at the low velocity.

TABLE 12

Situations of occurrence of fixation between oscillator and movable member after storage for 100 hours in environment of temperature of 70° C. and humidity of 95%.

| Silicon beads [% by weight] | PTFE [% by weight] | | | | | | |
|---|---|---|---|---|---|---|---|
| | 0 | 5 | 10 | 15 | 20 | 25 | 30 |
| 0 | NG | OK | OK | OK | OK | OK | OK |
| 5 | OK | OK | OK | OK | OK | OK | OK |
| 10 | OK | OK | OK | OK | OK (Second Embodiment) | OK | OK |
| 15 | OK | OK | OK | OK | OK | OK | OK |
| 20 | OK | OK | OK | OK | OK | OK | OK |

OK: Fixation not appeared
NG: Fixation appeared

Table 12 shows the relationship between the appearance situation of the fixation between the oscillator (elastic member) and the movable member and the contents of the silicon beads and PTFE contained in the epoxy-phenol resin for forming the epoxy resin film.

A plurality of oscillatory wave motors were prepared, which are mutually different in the amounts of the silicon beads and PTFE contained in the epoxy-phenol resin for forming the epoxy resin film, although the plurality of oscillatory wave motors had approximately the same form as that of the oscillatory wave motor 10 of the second embodiment. The investigation was made about the appearance of the fixation when the respective oscillatory wave motors were stored for 100 hours in an environment of a temperature of 70° C. and a relative humidity of 95%.

When the silicon beads and PTFE were not added to the isocyanate curable type epoxy resin described in the first embodiment, then the fixation was caused, and the force of fixation was large. It was difficult to separate the elastic member 12 and the movable member 13 from each other.

When the silicon beads and PTFE were not added to the epoxy-phenol resin, then the force of fixation was small as compared with the case of the first embodiment, and the fixation force was in such an extent that the fixation was separable by hand. However, as shown in Table 12, the fixation was caused.

However, when the silicon beads and PTFE were contained in an amount of not less than 5% by weight respectively, it is possible to avoid the occurrence of the fixation even in the high temperature and high humidity environment in which the fixation tends to arise.

When PTFE was not contained, and only the silicon beads were contained in an amount of not less than 5% by weight, then the effect of the prevention of the fixation was exhibited. This is the effect based on the fact that the silicon beads, which are contained in the epoxy resin film, behave as the points or the circles (minute surfaces) which make contact with the alumite coating layer of the movable member.

In the case of the oscillatory wave motor 10 of the second embodiment, the epoxy-phenol resin, which forms the epoxy resin film 17, contains PTFE in an amount of 20% by weight and the acrylic beads in an amount of 10% by weight. The oscillatory wave motor 10 of the second embodiment satisfies the condition of the preferred contents in view of the prevention of the fixation.

TABLE 13

Contents of PTFE and silicon beads and holding torque

| Silicon beads [% by weight] | PTFE [% by weight] | | | | | | |
|---|---|---|---|---|---|---|---|
| | 0 | 5 | 10 | 20 | 30 | 35 | 40 |
| 0 | OK | OK | OK | OK | OK | OK | NG |
| 5 | OK | OK | OK | OK | OK | OK | NG |
| 10 | OK | OK | OK | OK | OK Second Embodiment | OK | NG |
| 20 | OK | OK | OK | OK | OK | OK | OK |

OK: not less than prescribed value
NG: not more than 80% of prescribed value

Table 13 shows the relationship between the holding torque and the contents of the silicon beads and PTFE contained in the epoxy-phenol resin for forming the epoxy resin film.

A plurality of oscillatory wave motors were prepared, which are mutually different in the amounts of the silicon beads and PTFE contained in the epoxy-phenol resin for forming the epoxy resin film, although the plurality of oscillatory wave motors had approximately the same form as that of the oscillatory wave motor 10 of the second embodiment. The investigation was made for whether or not the prescribed value of the holding torque was satisfied when the driving operation was performed at a driving voltage of AC 30 V and a number of revolutions of 60 rpm.

The prescribed value of the holding torque for those shown in Table 13 is 150 N·mm as described in the first embodiment.

As shown in Table 13, when only the epoxy-phenol resin was coated on the frictional contact surface of the elastic member, the holding torque, which was not less than the prescribed value, was obtained. When PTFE and the silicon beads were added to the epoxy-phenol resin, the holding torque, which was not less than the prescribed value, was also obtained.

Further, when the epoxy-phenol resin shown in the second embodiment was used, the numerical values of the holding torque were large and satisfactory as a whole as compared with when the isocyanate curable type epoxy resin of the first embodiment was used.

However, when the content of the silicon beads was not more than 10% by weight, if the content of PTFE exceeded 35% by weight, then the holding torque was not more than 80% of the prescribed value.

Therefore, according to the result shown in Table 13, it has been revealed that the amount of PTFE contained in the epoxy-phenol resin is preferably not more than 35% by weight in order to improve the holding torque.

In the case of the epoxy resin film 17 of the second embodiment, the content of PTFE is 20% by weight, and the content of the silicon beads is 10% by weight. Therefore, the condition of the preferred contents to improve the holding torque is satisfied.

TABLE 14

Rate of change of input current after 50,000 revolutions

| | Load torque [N·mm] | Times of driving for measuring durability | Rate of change of input current |
|---|---|---|---|
| Conventional oscillatory wave motor (electroless Ni—P plating layer) | 19.6<br>58.8 | 50,000<br>50,000 | +10%<br>+40% |
| Oscillatory wave motor of second embodiment (epoxy resin film) | 19.6<br>58.8 | 50,000<br>50,000 | +4%<br>+7% |

Table 14 shows the comparison between the oscillatory wave motor 10 of the second embodiment and a conventional oscillatory wave motor in relation to the rate of change of the input current value after 50,000 revolutions.

The conventional oscillatory wave motor has approximately the same form as that of the oscillatory wave motor 10 of the second embodiment, except that an electroless Ni—P plating layer is formed on the frictional contact surface of the elastic member.

The oscillatory wave motor 10 of the second embodiment and the conventional oscillatory wave motor were rotated 50,000 revolutions under the same condition, and the investigation was made about the rate of change of the input current value before and after the rotation. The measurement was performed for two conditions of the load torque during the rotation of 19.6 N·mm (200 gf·cm) and 58.8 N·mm (600 gf·cm). The number of revolutions during the measurement was 60 rpm.

As shown in Table 14, in the case of the conventional oscillatory wave motor, the input current value change rate is +10% when the load torque is 19.6 N·mm. The input current value change rate is +40% when the load torque is 58.8 N·mm. The input current value change rate is greatly increased at each of the load torques. The input current value change rate is large as well, when the load torque is increased.

However, in the case of the oscillatory wave motor 10 of the second embodiment, the input current value change rate is +4% when the load torque is 19.6 N·mm. The input current value change rate is +7% when the load torque is 58.8 N·mm. The input current value change rate is small at each of the load torques. The input current value change rate is small as well, when the load torque is increased.

Further, the input current value change rate is smaller at each of the load torques in the case of the epoxy resin film 17 using the epoxy-phenol resin of the second embodiment, than the epoxy resin film 17 using the isocyanate curable type epoxy resin described in the first embodiment. This indicates the fact that the epoxy resin film 17 of the second embodiment is excellent in the abrasion resistance as compared with that of the first embodiment.

Therefore, when the epoxy resin film 17 of the second embodiment is formed, then the rate of change of the input current value is decreased after performing the driving rotation of 50,000 revolutions, and the durability of the oscillatory wave motor is improved.

TABLE 15

Abrasion depth after 50,000 revolutions

| | Abrasion depth [μm] of frictional contact surface |
|---|---|
| Conventional oscillatory wave motor (electroless Ni—P plating layer) | 3 |
| Oscillatory wave motor of second embodiment (epoxy resin film) | 0.7 |

Table 15 shows the comparison between the oscillatory wave motor 10 of the second embodiment and a conventional oscillatory wave motor in relation to the amount of abrasion of the frictional contact surface of the elastic member.

The conventional oscillatory wave motor has approximately the same form as that of the oscillatory wave motor 10 of the second embodiment, except that an electroless Ni—P plating layer is formed on the frictional contact surface of the elastic member.

The oscillatory wave motor 10 of the second embodiment and the conventional oscillatory wave motor were rotated at a load torque of 20 N·mm and a number of revolutions of 60 rpm to measure the abrasion amount of the frictional contact surface of the elastic member as the abrasion depth after they were rotated 50,000 revolutions.

As shown in Table 15, in the case of the conventional oscillatory wave motor, the abrasion depth of 3 μm was brought about by being rotated 50,000 revolutions. On the other hand, the generated abrasion depth was 0.7 μm in the case of the oscillatory wave motor 10 of the second embodiment. The abrasion depth of the epoxy resin film 17 of the second embodiment was smaller than that of the first embodiment. This indicates the fact that the epoxy-phenol resin is hard and it is satisfactory in the abrasion resistance as compared with the isocyanate curable type epoxy resin.

Therefore, when the epoxy resin film 17 of the second embodiment is formed on the frictional contact surface of the elastic member 12, then the abrasion amount is decreased, and it is possible to improve the durability.

TABLE 16

Thickness of epoxy resin film (main agent: epoxy-phenol resin) and presence or absence of fixation

| Thickness [μm] | Presence or absence of occurrence of fixation |
|---|---|
| 10 | OK |
| 20 | OK |
| 40 | OK |
| 60 | OK |
| 80 | OK |
| 100 (second embodiment) | OK |
| 120 | NG |

OK: fixation not appeared
NG: fixation appeared

Table 16 shows the relationship between the film thickness of the epoxy resin film and the occurrence of the fixation.

Seven oscillatory wave motors were prepared, which are different only in the thickness of the epoxy resin film within a range from 10 to 70 μm by an unit of 10 μm, although the oscillatory wave motors had approximately the same form as that of the oscillatory wave motor 10 of the second embodiment. The investigation was made about the appearance situation of the fixation between the epoxy resin film of the elastic member and the alumite coating layer of the movable member when the oscillatory wave motors were stored for 100 hours in an environment of a temperature of 70° C. and a humidity of 95%.

As shown in Table 16, the fixation was not caused when the thickness of the epoxy resin film was not more than 100 μm. However, the fixation was caused when the thickness of the epoxy resin film was not less than 120 μm. Therefore, it is preferable that the film thickness of the epoxy resin film is not more than 100 μm in order to avoid the fixation and to improve the start-up characteristic and the driving performance.

In the case of the oscillatory wave motor 10 of the second embodiment, the thickness of the epoxy resin film 17 is 30 μm. The oscillatory wave motor 10 of the second embodiment thus satisfies the condition of the preferred film thickness for the prevention of the fixation.

When the isocyanate curable type epoxy resin of the first embodiment was used, the upper limit thickness of the epoxy resin film 17 was 60 μm. However, in the case of this embodiment using the epoxy-phenol resin, the film thickness can be thickened to 100 μm. Therefore, it is possible to improve the durability.

TABLE 17

Particle size of silicon beads and rate of change of input current minimum value

| Particle size [μm] | Rate of change of input current minimum value after driving for 1 hour |
| --- | --- |
| 2 | not more than 5% |
| 6 (second embodiment) | not more than 5% |
| 8 | 9% |

Table 17 shows the relationship between the particle size of the silicon beads and the rate of change of the input current minimum value.

Three oscillatory wave motors were driven for 1 hour, which are different in the particle size of the silicon beads added to the epoxy-phenol resin as 2 μm, 6 μm, and 8 μm, although the oscillatory wave motors had approximately the same form as that of the oscillatory wave motor 10 of the second embodiment. The investigation was made about the rate of change of the input current minimum value before the driving and after the driving.

As shown in Table 17, when the particle size of the silicon beads was 8 μm, the input current minimum value change rate was 9% after the driving for 1 hour. However, when the particle size of the silicon beads was not more than 6 μm, the change rate was not more than 5%. Therefore, it is desirable that the particle size of the silicon beads is not more than 6 μm in view of the execution of the stable driving.

In the case of the oscillatory wave motor 10 of the second embodiment, the particle size of the silicon beads added to the epoxy-phenol resin is 6 μm. It is possible to perform the stable driving.

TABLE 18

Situation of occurrence of fixation for oscillator and movable member after storage for 100 hours in environment of temperature of 70° C. and humidity of 95%

| Silicon beads diameter [μm] | PTFE [wt. %] | | |
| --- | --- | --- | --- |
| | 0 | 10 | 20 |
| 2 | OK | OK | OK |
| 6 | OK | OK | OK |
| 8 | OK | OK | OK |

OK: fixation not appeared
NG: fixation appeared

Table 18 shows the relationship between the particle size of the silicon beads and the occurrence of the fixation.

Oscillatory wave motors were prepared, which are different in the amount of PTFE and the particle size of the silicon beads added to the epoxy-phenol resin, although the oscillatory wave motors had approximately the same form as that of the oscillatory wave motor 10 of the second embodiment. The investigation was made about the appearance of the fixation when the respective oscillatory wave motors were stored for 100 hours in an environment of a temperature of 70° C. and a relative humidity of 95%.

As shown in Table 18, it is possible to avoid the occurrence of the fixation when the silicon beads are contained irrelevant to the presence or absence of PTFE. According to the result shown in Table 17, it is preferable that the particle size of the silicon beads is made to be small in view of the stable driving. However, according to the result shown in Table 18, there is no special limitation for the particle size of the silicon beads in view of the prevention of the fixation of the frictional contact surface.

In the case of the oscillatory wave motor 10 of the second embodiment, the silicon beads of 6 μm are added to the epoxy-phenol resin. It thus is possible to avoid the occurrence of the fixation, and it is possible to perform the stable driving.

TABLE 19

Content of conductive carbon and maximum load torque

| Conductive carbon [% by weight] | Maximum load torque measured value/ prescribed value | Judgment | Charge voltage [kV] |
| --- | --- | --- | --- |
| 0 | 0.8 | NG | 1.5 |
| 1 | 0.8 | NG | 0 |
| 2 | 1 (prescribed value) | OK | 0 |
| 5 | 1.5 | OK | 0 |
| 8 | 1.4 | OK | 0 |
| 10 | 1.2 | OK | 0 |
| 11 | 0.9 | ALW | 0 |

OK: good,
ALW: allowable,
NG: no good

Table 19 shows the relationship between the content of the conductive carbon and the maximum load torque.

Six oscillatory wave motors were prepared, which are different in the amount of the conductive carbon contained in the epoxy-phenol resin, although the oscillatory wave motors had approximately the same form as that of the oscillatory wave motor 10 described in the second embodiment. The maximum load torque was determined for the motors. In Table 19, one of the oscillatory wave motors, which had the content of the conductive carbon of 2% by weight, was designated as the reference, and the maximum load torque thereof is regarded as the prescribed value. The ratio between the measured value and the prescribed value of the maximum load torque was determined for each of the oscillatory wave motors. The ratio of the measured value of the maximum load torque with respect to the prescribed value is preferably not less than 1. However, the ratio of not less than 0.9 was regarded to be within an allowable range.

As shown in Table 19, the following fact was revealed. That is, when the content of the conductive carbon was 1% by weight, the ratio of the measured value of the maximum load torque to the prescribed value was 0.8, which was not suitable for the use as the oscillatory wave motor. On the other hand, when the content of the conductive carbon was 11% by weight, the ratio of the measured value of the maximum load torque to the prescribed value was 0.9 which was within the allowable range but which was lower than the prescribed value.

Therefore, when the content of the conductive carbon is 2 to 10% by weight, it is possible to increase the maximum load torque, which in turn is effective to improve the driving performance.

In the case of the oscillatory wave motor 10 of the second embodiment, the amount of the conductive carbon contained in the epoxy-phenol resin is 3.5% by weight. The oscillatory wave motor 10 of the second embodiment satisfies the condition of the content which is effective to improve the maximum load torque.

As shown in Table 19, when the conductive carbon was added to the epoxy resin film 17, the charge voltage of the frictional contact surface of the elastic member 12 was 0 (zero) V, for the following reason. That is, an effect to avoid the static electricity is obtained by adding the conductive carbon.

TABLE 20

Surface roughness of epoxy resin film (main agent: epoxy-phenol resin) and rate of change of input current minimum value

| Treatment | Maximum height roughness Rz [μm] | Change rate of input current minimum value after driving for 1 hour |
|---|---|---|
| polish with waterproof paper #400 | 1.1 | about 10% |
| polish with waterproof paper # 800 | 0.9 | not more than 5% |
| polish with GC #1000 | 0.6 | not more than 5% |
| polish with GC #2000 | 0.5 | not more than 5% |
| polish with GC #4000 | 0.4 | not more than 5% |

*GC: abbreviation of green carborundum

Table 20 shows the relationship between the surface roughness of the epoxy resin film and the rate of change of the input current minimum value.

As shown in Table 20, five oscillatory wave motors were prepared, which are different in the surface roughness of the epoxy resin film, although the oscillatory wave motors had approximately the same form as that of the oscillatory wave motor 10 described in the second embodiment. The investigation was made about the rate of change of the input current minimum value after the driving for 1 hour. The surface roughness is indicated by the maximum height roughness Rz (JIS B0601-2001).

As shown in Table 20, when the maximum height roughness Rz exceeded 1 μm, the rate of change of the input current minimum value after the driving for 1 hour was about 10%. However, when the maximum height roughness Rz was not more than 1 μm, the rate of change was not more than 5%. Therefore, the following fact has been revealed for the surface roughness of the epoxy resin film 17. That is, it is desirable that the maximum height roughness Rz is not more than 1 μm in view of the execution of the stable driving.

In the case of the oscillatory wave motor 10 of the second embodiment, the maximum height roughness Rz of the surface of the epoxy resin film 17 is 0.4 μm. It is possible to perform the stable driving.

The epoxy resin film 17 of the second embodiment has a satisfactory flatness of the frictional contact surface, even when the epoxy resin film 17 of the second embodiment is polished under the same condition as that for the epoxy resin film 17 described in the first embodiment.

According to the results shown in Tables 11 to 20, it is preferable to provide the amounts of the respective additives contained in the epoxy-phenol resin for forming the epoxy resin film 17 as follows, in view of the improvement in the start-up characteristic at the low velocity, the prevention of the fixation, the improvement in the holding torque, and the improvement in the maximum load torque. That is, PTFE is 10 to not more than 35% by weight, the silicon beads are 5 to not more than 20% by weight, and the conductive carbon is 2 to not more than 10% by weight.

Further, it is preferable that the particle size of the silicon beads is not more than 6 μm, in view of the realization of the stable driving.

Further, the thickness of the epoxy resin film 17 is preferably not more than 100 μm, in view of the prevention of the fixation. As for the surface roughness of the epoxy resin film 17, the maximum height roughness Rz is preferably not more than 1 μm in view of the realization of the stable driving.

TABLE 21

Comparison of chemical resistance of epoxy resin film between first embodiment and second embodiment

| | Sulfide |
|---|---|
| First embodiment (main agent: isocyanate curable type epoxy resin) | detected |
| Second embodiment (main agent: epoxy-phenol resin) | not detected |

Table 21 shows the chemical resistance in relation to the epoxy resin film 17 of the first embodiment using the isocyanate curable type epoxy resin and the epoxy resin film 17 of the second embodiment using the epoxy-phenol resin.

The oscillatory wave motors 10 of the first and second embodiments, which are mutually different in the main agent of the epoxy resin film 17 and the like, were driven for 5 minutes. After that, the surfaces of the epoxy resin films 17 of both the embodiments were analyzed by using the TOF-SIMS (Time of Flight Secondary Ion Mass Spectromerty) method.

In the TOF-SIMS method, the mass spectrometric analysis is performed on the basis of the difference in the time of flight between secondary ions by using the phenomenon in which, when an ion (primary ion) such as gallium is radiated onto a surface of a sample in vacuum and when the secondary ions released from the sample surface are accelerated at a constant voltage, then lighter ion arrives at a detector earlier than heavier ion.

As shown in Table 21, the sulfide was detected from the surface of the epoxy resin film 17 of the first embodiment after the driving for 5 minutes. This indicates the fact that any component of the epoxy resin film 17 of the first embodiment is chemically reacted with the sulfuric acid component contained in a minute amount in the alumite coating layer 18, as a result of the frictional contact with the alumite coating layer 18 by the driving. In other words, when the driving operation is performed, the epoxy resin film 17 of the first embodiment is eroded by the sulfuric acid component of the alumite coating layer 18. Such a chemical reaction causes the deterioration of the frictional contact surface, which deteriorates the durability and the driving performance of the oscillatory wave motor.

However, any sulfide was not detected from the surface of the epoxy resin film 17 of the second embodiment after the driving for 5 minutes. This indicates the fact that even when the frictional contact arises with respect to the alumite coating layer 18 in accordance with the driving, then the epoxy resin film 17 of the second embodiment is not chemically reacted with the sulfuric acid component of the alumite coating layer 18, and the epoxy resin film 17 of the second embodiment is not eroded.

Therefore, the epoxy resin film 17 of the second embodiment is excellent in the chemical resistance, and it is chemically stable, as compared with the epoxy resin film 17 of the first embodiment.

In the case of the oscillatory wave motor 10 of the second embodiment, the epoxy-phenol resin is used for the epoxy resin film 17. Further, the oscillatory wave motor 10 of the second embodiment contains PTFE in an amount of 20% by weight, the acrylic beads in an amount of 10% by weight, and the conductive carbon in an amount of 3.5% by weight. The contents of the respective additives satisfy the condition of the preferred contents in view of the improvement in the start-up characteristic at the low velocity, the prevention of the fixation, the improvement in the holding torque, and the improvement in the maximum load torque, i.e., the condition in which PTFE is 10 to not more than 35% by weight, the silicon beads are 5 to not more than 20% by weight, and the conductive carbon is 2 to not more than 10% by weight.

When the oscillatory wave motor 10 of the second embodiment was driven, the following effects were obtained as compared with the conventional oscillatory wave motor, in the same manner as in the first embodiment.

(1) The abrasion amount of the frictional contact surface is extremely small. Therefore, the abrasion powder is scarcely generated, and the shape of the elastic member 12 is not deformed.

(2) The stable frictional driving is obtained over a long period of time.

(3) Any abnormal sound generated during the frictional driving is small.

(4) The start-up characteristic at the low velocity is satisfactory in the low temperature environment, wherein the start-up characteristic is satisfactory in a temperature range of −40° C. to 80° C., and the start-up characteristic is especially satisfactory in a temperature range of −20° C. to 60° C.

(5) The current value is scarcely changed after the driving for a long period of time at a high load, and it is possible to obtain the stable driving.

(6) It is unnecessary to perform the masking processing step, the adhering step of any formed product of resin or the like, the discarding treatment for any surface treatment solution, and the like; and it is possible to shorten the operation steps and operation time, and the like; and it is possible to decrease the production cost.

The oscillatory wave motor 10 of the second embodiment was satisfactory in the durability, the abrasion resistance, the start-up characteristic at the low temperature, and the driving performance, as compared with the oscillatory wave motor 10 of the first embodiment.

Further, the oscillatory wave motor 10 of the second embodiment is excellent in the chemical resistance of the frictional contact surface, and it is chemically stable, as compared with the oscillatory wave motor 10 of the first embodiment.

Third Embodiment

Figure 3:
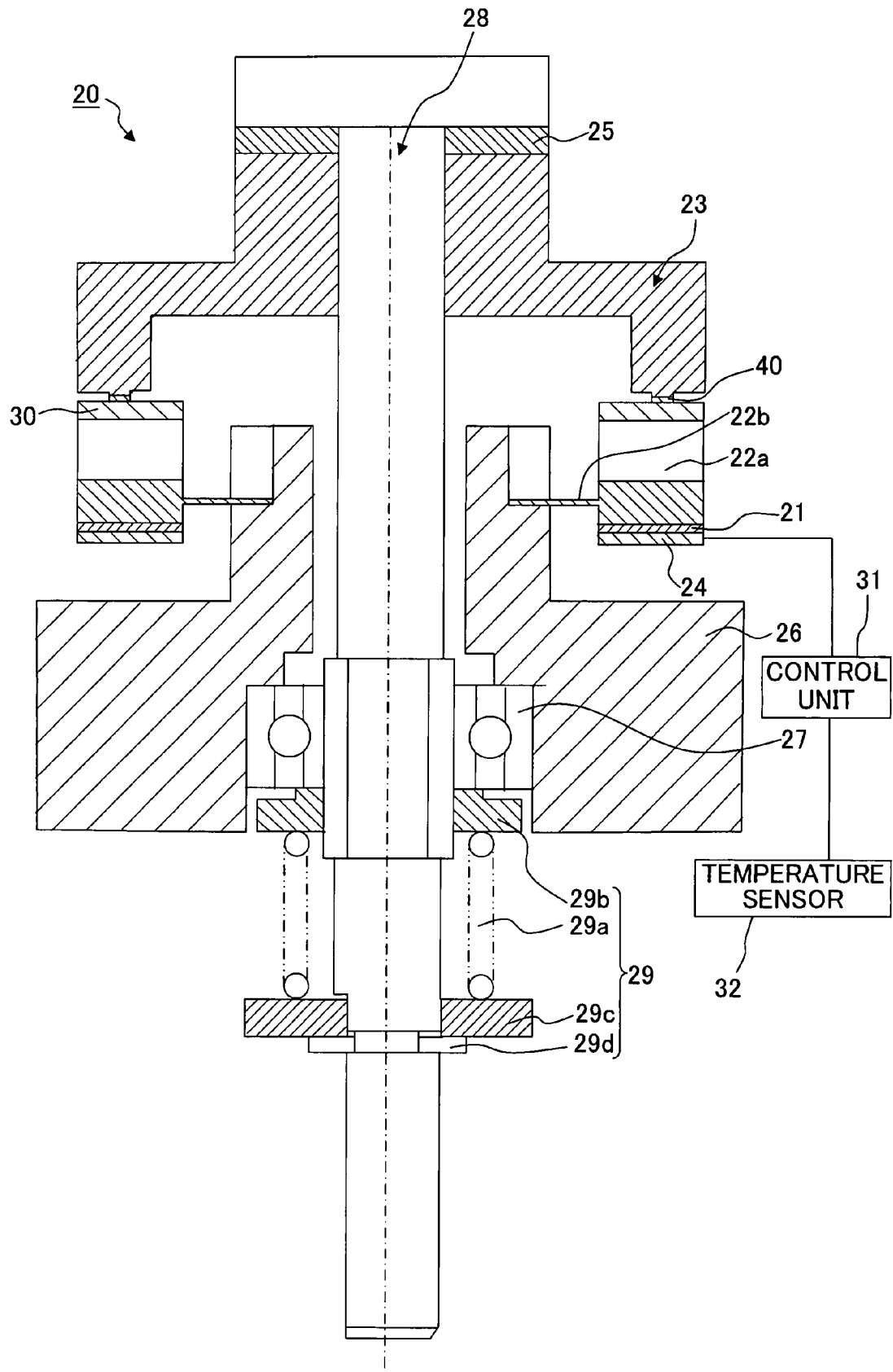
FIG. 3 illustrates an oscillatory wave motor according to a third embodiment.

FIG. 3 illustrates an oscillatory wave motor according to a third embodiment.

The oscillatory wave motor 20 according to the third embodiment includes an elastic member 22 and a piezoelectric member 21 for forming an oscillator, a movable member 23, a support member 26, an output shaft 28, and the like. The oscillatory wave motor 20 is provided for an unillustrated camera, and the oscillatory wave motor 20 is used as a driving source for driving a driven member which performs the zooming operation of an unillustrated lens barrel.

The oscillator is a member having a substantially annular shape including the elastic member 22, the piezoelectric member 21 joined to the elastic member 22, and the like. The progressive oscillatory wave is generated in accordance with the expansion and contraction of the piezoelectric member 21.

The elastic member 22 is a member having a substantially annular shape formed of a metal such as stainless steel having a large resonance sharpness. The piezoelectric member 21 is joined, at one surface thereof, to the elastic member 22. A comb tooth portion 22a is provided on the other surface of the elastic member 22, the comb tooth portion 22a being formed in the other surface of the elastic member 22 by cutting a plurality of grooves in the other surface in the circumferential direction. A tip-end surface of the comb tooth portion 22a is pressurized to make contact with the movable member 23 so as to serve as a frictional contact surface for frictionally driving the movable member 23.

An epoxy resin film 30, which is formed of an isocyanate curable type epoxy resin in the same manner as in the example described in the first embodiment, is formed on the frictional contact surface of the elastic member 22. The epoxy resin film 30 of this embodiment includes a main agent of the isocyanate curable type epoxy resin; and contains 20% by weight of PTFE, 10% by weight of acrylic beads, and 3.5% by weight of conductive carbon. The thickness of the epoxy resin film 30 is 30 μm.

The elastic member 22 has a brim-shaped flange portion 22b which is formed to extend in the radial direction on the inner circumferential side thereof. The elastic member 22 is supported by and fixed to the support member 26 by the aid of the flange portion 22b.

This embodiment is illustrative of a case in which the isocyanate curable type epoxy resin is used as the main agent for the epoxy resin film 30. However, there is no limitation thereto. It is also allowable to use an epoxy-phenol resin as the main agent. Those which are optimum may be appropriately selected and used for the surface roughness and the film thickness of the epoxy resin film 30 and the contents of the respective additives such as PTFE within the ranges of the conditions described in the first and second embodiments. For example, the epoxy resin film 30 of this embodiment may include the epoxy-phenol resin as the main agents, and may contain 20% by weight of PTFE, 10% by weight of the silicon beads having a particle size of 6 μm, and 3.5% by weight of the conductive carbon, wherein the film thickness may be 30 μm.

The piezoelectric member 21 is an electromechanical conversion element which converts the electric energy into the mechanical energy. The piezoelectric member 21 is expanded and contracted in accordance with the driving signal supplied from a flexible printed circuit board 24 electrically connected to the piezoelectric member 21 at a predetermined electrode portion thereof to generate the oscillation or vibration on the elastic member 22. A control unit 31, which controls the camera provided with the oscillatory wave motor 20, is connected to the flexible printed circuit board 24. In this embodiment, a temperature sensor 32 is connected to the control unit 31, and the control unit 31 adjusts a driving signal to be supplied to the piezoelectric member 21 depending on the sensing result of the temperature sensor 32. Specifically, in the case of the oscillatory wave motor 20 shown in FIG. 3, the frequency of the driving signal is adjusted depending on the sensed temperature condition so that the number of revolutions is constant (about 350 rpm).

The movable member 23 is a relative movement member which is pressurized to make contact with the elastic member 22 and which is driven and rotated in accordance with the elliptic motion caused by the progressive oscillatory wave generated on the frictional contact surface of the elastic member 22. The movable member 23 is a member formed of a light metal such as aluminum, and is fitted to the output shaft 28. The movable member 23 of this embodiment is formed of an aluminum alloy. An alumite coating layer 40 is formed on a surface of the movable member 23. The frictional contact surface between the movable member 23 and the oscillator (elastic member 22) has such a form that the alumite coating layer 40 and the epoxy resin film 30 make contact with each other.

The output shaft 28 has a substantially cylindrical shape. One end of the output shaft 28 is fitted to the movable member 23, and the other end of the output shaft 28 is rotatably attached to the support member 26 via a bearing 27. The output shaft 28 is rotated integrally with the movable member 23 to transmit the rotational motion of the movable member 23 to an unillustrated driven member.

A pressurizing section 29 is a mechanism to pressurize the oscillator and the movable member 23, and is provided on the output shaft 28. The pressurizing section 29 is provided with a spring 29a which generates the pressurizing force, a holding ring 29b which is arranged in contact with the bearing 27 and which holds one end of the spring 29a, a holding ring 29c which holds the other end of the spring 29a, and an E ring 29d which is inserted into a groove formed in the output shaft 28 and which regulates the position of the holding ring 29c.

Also in the oscillatory wave motor 20 as described in this embodiment, the epoxy resin film 30, which is formed of the isocyanate curable type epoxy resin, is formed on the frictional contact surface of the elastic member 22. Accordingly, it is possible to realize, for example, the reduction of the abrasion powder, the improvement in the durability upon the driving for a long period of time under a high load, the stabilization of the driving performance, the reduction of the abnormal sound, and the improvement in the start-up characteristic at a low velocity in a low temperature environment. The oscillatory wave motor 20 described in this embodiment is small in size, for which it is difficult to perform the treatment such as the masking. However, according to the embodiment of the present invention, the epoxy resin film 30 can be formed with ease by coating the epoxy resin film 30 to the elastic member 22. It is therefore possible to shorten the operation steps, and it is possible to perform the production cheaply and easily. It is also unnecessary to perform, for example, the discarding treatment for the surface treatment liquid.

Modified Embodiment

The present invention is not limited to the embodiments described above. It is possible to provide various modifications and changes which are also within the equivalent of the present invention.

(1) The first embodiment is illustrative of the case in which the epoxy resin film 17 uses the main agent of the isocyanate curable type resin, and the second embodiment is illustrative of the case in which the epoxy resin film 17 uses the main agent of the epoxy-phenol resin. However, there is no limitation thereto. For example, the main agent of the epoxy resin film 17 of the first embodiment may be the epoxy-phenol resin, and the main agent of the epoxy resin film 17 of the second embodiment may be the isocyanate curable type epoxy resin.

In the respective embodiments, as for the main agent of the epoxy resin film 17, 30, it is also allowable to use an epoxy resin in which the isocyanate is added as the curing agent, and the phenol resin is blended as the curable prepolymer.

(2) In the respective embodiments, the epoxy resin film 17, 30 is formed on the side of the elastic member 12, 22. However, there is no limitation thereto. The epoxy resin film may be formed on the side of the movable member 13, 23. Alternatively, it is allowable that the epoxy resin film is formed on the piezoelectric member 11, 21, rather than using the elastic member 12, 22. Still alternatively, the epoxy resin film may be formed on each of the members (elastic member 12, 22 and movable member 13, 23) for forming the contact surface.

(3) In the respective embodiments, the stainless steel is used as the material for forming the elastic member 12, 22. However, it is also allowable to use another iron-based material. For example, it is also allowable to use various steel materials such as S15C, S55C, SCr445, SNCM630, and the like. Alternatively, it is also allowable to use phosphorous bronze and aluminum-based alloy.

(4) The respective embodiments are illustrative of the case in which the movable member 13, 23 is formed of the aluminum alloy. However, there is no limitation thereto. It is also allowable to use, for example, an iron-based material. For example, it is also allowable to use various steel materials such as S15C, S55C, SCr445, SNCM630, and the like. Alternatively, it is also allowable to use a resin having high heat resistance such as PI, PEEK and the like.

(5) The respective embodiments are illustrative of the case in which the present invention is coated on the rotary type oscillatory wave motor 10, 20. However, there is no limitation thereto. The present invention is also applicable, for example, to a linear driving type oscillatory wave motor in which the relative movement member is driven linearly or in a straight direction. The respective embodiments are exemplified by the oscillatory wave motor of the rotary type (annular or circular type) in which the movable member 13, 23 is driven and rotated by way of example, for the following reason. That is, the fixation causes any problem in many cases in relation to the oscillatory wave motor of this type. The application of the present invention brings about the especially great effect.

(6) The respective embodiments are exemplified by the oscillatory wave motor 10, 20 in which the movable member 13 is driven by the progressive oscillatory wave based on the two bending motions by way of example. However, the present invention is also applicable to oscillatory wave motors and oscillatory actuators using any other driving mode including, for example, rod type actuators, pencil type actuators, and disk type actuators using the bending vibration or the in-plane vibration.

(7) The respective embodiments are exemplified by the oscillatory wave motor 10, 20 which uses the ultrasonic region by way of example. However, it is enough to adopt any motor in which a first member and a second member perform the relative movement while making contact with each other. The present invention is also applicable to any electromechanical conversion actuator which does not use the ultrasonic region.

(8) In the first and second embodiments, the oscillatory wave motor 10 is illustrative of the case in which the oscillatory wave motor 10 is used as the driving source for performing the focusing operation for the lens barrel of the camera. In the third embodiment, the oscillatory wave motor 20 is illustrative of the case in which the oscillatory wave motor 20 is used as the driving source for performing the zooming operation for the lens barrel of the unillustrated camera. However, there is no limitation thereto. For example, each of the oscillatory wave motors 10 of the first and second embodiments may be used for the driving source for performing the zooming operation for the lens barrel. The oscillatory wave motor 20 of the third embodiment may be used for the driving source for performing the focusing operation for the lens barrel. Further, the oscillatory wave motors 10, 20 of the first to third embodiments may be used, for example, for a driving source for a copying machine or the like, and for a driving unit for a head rest or a handle tilt unit of an automobile.

(9) In the respective embodiments, the condition such as the curing temperature, under which the epoxy resin film 17, 30 is formed, is described. However, there is no limitation thereto. The condition may be appropriately selected. The states of the main agent and the additives are not limited to those described in the respective embodiments as well, and may be appropriately selected. The thermosetting resin is not especially limited. It is also allowable to use a material in which the silicon beads as the additive are previously dispersed in the phenol resin as the thermosetting resin. In the embodiment of the present invention, the thermosetting resin is used. Therefore, the resin can be coated on the elastic member 12 to form the resin film. The production can be performed with ease as compared with the case in which any formed and processed product is used.

(10) As for the particulate additive to avoid the fixation of the frictional contact surface, it is enough to use those which can provide the form of the contact on the points or the circles (minute surfaces) with the alumite coating layer 18, 40 in addition to the acrylic beads, the silicon beads, and the carbon beads. It is also allowable to use a plurality of types of additives. When the silicon beads are added, it is also possible to improve the heat resistance and the water resistance of the epoxy resin film 17, 30, in addition to the effect in which the fixation of the frictional contact surface can be avoided. The acrylic beads and the carbon beads not only function as the additive for avoiding the fixation of the frictional contact surface but also function as the frictional coefficient-increasing agent for increasing the frictional coefficient of the frictional contact surface. Here, when a resin film is formed by using the particulate additive and any thermoplastic resin, a problem arises such that the resin film is melted due to the frictional heat generated on the contact surface, the additive is moved and/or removed, and the stable driving cannot be performed. However, in the embodiment of the present invention, the resin film is formed by using the particulate additive and the thermosetting resin. Therefore, any redissolution or remelting is not caused, which would be otherwise caused by the frictional heat. It is also possible to avoid the problem as described above.

(11) In the respective embodiments, PTFE is used as the fluororesin. However, there is no limitation thereto. The selection may be made appropriately. Examples of the fluororesin include, for example, PFA (Tetrafluoroethylene-perfluoroalkoxyvinylether Copolymer), FEP (Tetrafluoroethylene-hexafluoropropylene Copolymer), PCTFE (Polychloro-Trifluoroethylene Copolymer), ETFE (Ethylene Tetrafluoroethylene Copolymer), ECTFE (Ethylene Chlorotrifluoroethylene Copolymer), PVDF (Polyvinylidene Fluoride), PVF (Polyvinylfluoride), and the like.

In the embodiments as described above, the epoxy resin film is formed directly on the elastic member 12. However, any film such as an adhesive film and/or the like may be intervened between the elastic member 12 and the epoxy resin film.

What is claimed is:

1. A motor comprising:
    a first member;
    a second member which makes contact with the first member, the first member and the second member being relatively movable; and
    a thermosetting resin film which is formed of a particulate additive and a thermosetting resin, and which is formed on at least one of contact surfaces of the first member and the second member;
    wherein the additive contains acrylic beads in an amount of 5 to 30% by weight.

2. The motor according to claim 1, wherein the additive is exposed on a surface of the thermosetting resin film.

3. The motor according to claim 1, wherein the acrylic beads have a particle size of not more than 5 µm.

4. The motor according to claim 1, wherein the thermosetting resin film is formed by using polytetrafluoroethylene.

5. The motor according to claim 4, wherein the thermosetting resin film is formed by using a frictional coefficient-increasing agent which increases a frictional coefficient of the contact surfaces.

6. The motor according to claim 5, wherein the thermosetting resin contains at least one of an epoxy resin and a phenol resin.

7. The motor according to claim 1, wherein the thermosetting resin contains at least one of an epoxy resin and a phenol resin.

8. The motor according to claim 7, wherein the epoxy resin is an isocyanate curable type epoxy resin.

9. The motor according to claim 8, wherein the epoxy resin is an epoxy resin to which a compound having one of phenolic hydroxyl group and methylol group is blended as a curable prepolymer.

10. The motor according to claim 1, wherein the thermosetting resin film is formed by using a fluororesin.

11. The motor according to claim 10, wherein the fluororesin is polytetrafluoroethylene.

12. The motor according to claim 1, wherein the thermosetting resin film is formed by using a frictional coefficient-increasing agent which increases a frictional coefficient of the contact surfaces.

13. The motor according to claim 12, wherein the frictional coefficient-increasing agent is carbon.

14. The motor according to claim 13, wherein the carbon is contained in an amount of 2 to 10% by weight.

15. The motor according to claim 1, wherein the thermosetting resin contains at least one of an epoxy resin and a phenol resin.

16. The motor according to claim 15, wherein the epoxy resin is an isocyanate curable type epoxy resin.

17. The motor according to claim 16, wherein the thermosetting resin film has a thickness of not more than 60 μm.

18. The motor according to claim 16, wherein the thermosetting resin film contains polytetrafluoroethylene in an amount of 5 to 35% by weight.

19. The motor according to claim 15, wherein the epoxy resin is an epoxy resin to which a compound having one of phenolic hydroxyl group and methylol group is blended as a curable prepolymer.

20. The motor according to claim 19, wherein the thermosetting resin film has a thickness of not more than 100 μm.

21. The motor according to claim 19, wherein the thermosetting resin film contains polytetrafluoroethylene in an amount of 10 to 35% by weight.

22. The motor according to claim 1, wherein the thermosetting resin film has a surface roughness in which a maximum height roughness is not more than 1 μm.

23. The motor according to claim 1, wherein the thermosetting resin film has a vertical cross-sectional shape which is substantially trapezoidal.

24. The motor according to claim 1, wherein:
the first member is an oscillator which generates oscillation on an elastic member in accordance with excitation of an electromechanical conversion element; and
the second member is a relative movable member which moves relative to the oscillator by the oscillation.

25. A lens barrel comprising:
the motor as defined in claim 1; and
an optical system which is driven by using the motor as a driving source.

26. A camera system comprising a mount portion to which the optical system as defined in claim 25 is mountable.

27. A motor comprising:
an oscillator which generates oscillation on an elastic member in accordance with excitation of an electromechanical conversion element;
a relative movable member which moves relative to the oscillator by the oscillation while making contact with the oscillator; and
a thermosetting resin film which is formed by using a particulate additive and a thermosetting resin containing at least one of an epoxy resin and a phenol resin and which is provided on at least one of contact surfaces of the oscillator and the relative movable member;
wherein the additive is acrylic beads and the thermosetting resin is an isocyanate curable type epoxy resin.

28. A motor comprising:
a first member;
a second member which makes contact with the first member, the first member and the second member being relatively movable; and
a thermosetting resin film which is formed of a particulate additive and a thermosetting resin, and which is formed on at least one of contact surfaces of the first member and the second member;
wherein the additive contains acrylic beads having a particle size of not more than 5 μm.

29. The motor according to claim 28, wherein the thermosetting resin film is formed by using a fluororesin.

30. The motor according to claim 28, wherein the thermosetting resin film is formed by using a frictional coefficient-increasing agent which increases a frictional coefficient of the contact surfaces.

31. The motor according to claim 28, wherein the thermosetting resin contains at least one of an epoxy resin and a phenol resin.

32. The motor according to claim 28, wherein the thermosetting resin film has a surface roughness in which a maximum height roughness is not more than 1 μm.

33. A lens barrel comprising:
the motor as defined in claim 28; and
an optical system which is driven by using the motor as a driving souce.

* * * * *